United States Patent
Kent et al.

(10) Patent No.: US 7,180,508 B2
(45) Date of Patent: Feb. 20, 2007

(54) DYNAMIC CORRECTIONS FOR A NON-LINEAR TOUCHSCREEN

(75) Inventors: Joel C. Kent, Fremont, CA (US); James L. Aroyan, Santa Cruz, CA (US)

(73) Assignee: Tyco Electronics Corporation, Middletown, PA (US)

(*) Notice: Subject to any disclaimer, the term of this patent is extended or adjusted under 35 U.S.C. 154(b) by 276 days.

(21) Appl. No.: 10/246,059

(22) Filed: Sep. 17, 2002

(65) Prior Publication Data
US 2004/0061687 A1  Apr. 1, 2004

(51) Int. Cl.
*G09G 5/00* (2006.01)

(52) U.S. Cl. ............... 345/178; 178/18.01; 345/173

(58) Field of Classification Search .......... 345/173, 345/178; 178/18.01, 17.02, 18.02
See application file for complete search history.

(56) References Cited

U.S. PATENT DOCUMENTS

| | | | |
|---|---|---|---|
| 3,925,610 A * | 12/1975 | French et al. ........... 178/18.03 |
| 4,220,815 A | 9/1982 | Gibson et al. | |
| 4,371,746 A | 2/1983 | Pepper | |
| 4,661,655 A | 4/1987 | Gibson et al. | |
| 4,678,869 A | 7/1987 | Kable | |
| 4,720,607 A * | 1/1988 | de Moncuit ............ 178/18.05 |
| 4,731,508 A | 3/1988 | Gibson et al. | |
| 4,797,514 A | 1/1989 | Talmadge et al. | |
| 4,822,957 A | 4/1989 | Talmadge et al. | |
| 5,045,644 A | 9/1991 | Dunthorn | |
| 5,220,136 A | 6/1993 | Kent | |
| 5,543,589 A * | 8/1996 | Buchana et al. ........ 178/18.03 |
| 5,650,597 A | 7/1997 | Redmayne ............. 178/19 |
| 5,940,065 A * | 8/1999 | Babb et al. .............. 345/178 |
| 6,016,140 A | 1/2000 | Blouin et al. | |
| 6,727,896 B2 * | 4/2004 | Tsang .................. 345/178 |
| 2003/0056999 A1 * | 3/2003 | Fukuda ............... 178/18.02 |

FOREIGN PATENT DOCUMENTS

| | | |
|---|---|---|
| EP | 0631256 A | 12/1994 |
| EP | 0 727 875 A1 | 8/1996 |
| EP | 01010156 A1 | 6/2000 |
| EP | 1158393 A | 11/2001 |
| WO | WO/98/19283 A1 | 5/1998 |

* cited by examiner

*Primary Examiner*—Kent Chang

(57) ABSTRACT

The present invention provides a way to measure and track non-linear corrections in touchscreens. Some or all of the relevant non-linear corrections may be determined automatically. Production floor test equipment may make electronic measurements, compute parameters, and load the parameters in non-volatile memory of the controller electronics. Alternatively, the controller electronics can make the electronic measurements and determine non-linear parameters. The latter embodiment of the invention permits the determination of non-linear parameters in the field, dynamically tracking changes in the non-linear characteristics of installed touchscreens that occur over time or due to environmental conditions.

33 Claims, 10 Drawing Sheets

DYNAMIC CORRECTIONS FOR A NON-LINEAR TOUCHSCREEN

BACKGROUND

The present invention relates to an apparatus and method for determining the coordinates of a location in a two-dimensional system, such as a touch sensitive screen for producing output signals related to a touch position. More particularly, the present invention relates to an apparatus and method for generating signals representing a touch position in which non-linear corrections are applied.

Touchscreens are becoming the computer input device of choice for an increasing variety of applications. A touchscreen is a transparent input device that is able to sense the position of the touch of a finger or other electronically passive stylus relative to the touchscreen. Typically, touchscreens are placed over display devices such as cathode-ray-tube monitors and liquid crystal displays. Touchscreen input is often preferred for applications such as restaurant order entry systems, industrial process control applications, interactive museum exhibits, public information kiosks, lap-top computers, and other such applications.

Many schemes have been proposed for touchscreen construction, some of which have met with commercial acceptance. One important aspect of touchscreen performance is a close correspondence between actual and measured touch positions at all locations within an active touch area. There are many types of touchscreens available including five-wire resistive touchscreens, four-wire resistive touchscreens, capacitive touchscreens, ultrasonic touchscreens, and infrared touchscreens. All of these types of touchscreen have attempted to deliver high standards of performance at cost-competitive prices.

Five-wire resistive touchscreens, such as the AccuTouch® product line of touchscreens from Elo TouchSystems, Inc. of Fremont, Calif., have been widely accepted for many touchscreen applications. In five-wire resistive touchscreens, mechanical pressure from a finger or stylus causes a flexible sheet, such as a plastic coversheet, to flex and make physical contact with an underlying rigid substrate, such as a glass substrate. The rigid substrate is coated with a resistive coating upon which voltage gradients are generated. Through electrical connections to the four corners of the rigid substrate, associated electronics can sequentially generate voltage gradients in the X and Y directions. The underside of the flexible sheet has a conductive coating that provides an electrical connection at the touch location between the resistive coating and the conductive coating. It should be noted that in this type of touchscreen system there are a total of five electrical connections, i.e., "five wires", between the touchscreen and the controller electronics. Further details regarding five-wire resistive touchscreens are found in the following U.S. Patents: U.S. Pat. No. 4,220,815 to Gibson; U.S. Pat. Nos. 4,661,655 and 4,731,508 to Gibson et al.; U.S. Pat. No. 4,822,957 to Talmadge et al.; U.S. Pat. No. 5,045,644 to Dunthorn; and U.S. Pat. No. 5,220,136 to Kent, the specifications of which are all herein incorporated by reference.

Four-wire resistive touchscreens dominate the low-end of the touchscreen market since the manufacturing costs for four-wire resistive touchscreens are generally less than the manufacturing costs for five-wire resistive touchscreens. However, in applications demanding reliable performance in the face of heavy use, the five-wire resistive technology has generally proven superior. To measure both X and Y coordinates, four-wire resistive touchscreens alternate between generating a voltage gradient on the substrate resistive coating and generating an orthogonal voltage gradient on the conductive coating of the flexible sheet. Performance of four-wire touchscreens degrades as the uniform resistivity of the conductive coating is lost as a result of mechanical flexing of the flexible sheet. This is not a problem for five-wire touchscreens, where both X and Y voltage gradients are generated on the rigid substrate's resistive coating, and the conductive coating on the flexible sheet need only provide electrical continuity. However, in a five-wire touchscreen, a peripheral electrode pattern of some complexity is required to enable sequential generation of both X and Y voltage gradients on the same resistive coating. A key design feature that distinguishes five-wire touchscreens from four-wire touchscreens is the presence of four corner connection points on the substrate of the five-wire touchscreen at which voltages are applied to a peripheral electrode pattern.

The controller electronics can obtain touch information from a five-wire resistive touchscreen through current injection, as well as voltage gradient generation as described above. In order to obtain touch information through current injection, a current source injects current though the flexible sheet and the current arriving at each of the four corner connection points is then measured. From the sums and ratios of these corner currents, touch positions are reconstructed. The choice between current injection and voltage generation is an electronics design choice and is largely independent of touchscreen design. Peripheral electrode pattern designs for touchscreen systems with voltage generation electronics are equally applicable to touchscreen systems using current injection.

In a capacitive touchscreen, the flexible sheet is replaced by a thin transparent dielectric coating that then forms an exterior layer over the ITO or ATO coated substrate. In one approach to electronic readout, an oscillating voltage is applied to the four corner connection points. A finger touch provides an AC shunt to ground and hence serves as an AC current source at the location of the touch. The division of this AC current between the four corner connection points is measured and used to determine the touch coordinates. An AC variant of current-injection electronics is used. Capacitive touchscreens often require peripheral electrode patterns that serve the same basic function as in five-wire resistive touchscreens. For example, 3M Touch Systems, Inc. offers both capacitive touchscreens (ClearTek™) and five-wire resistive touchscreens (TouchTek™) with peripheral electrode patterns similar to those illustrated in FIG. 1b of U.S. Pat. No. 4,371,746 to Pepper, the specification of which is herein incorporated by reference. It is widely known that peripheral electrode patterns can be used in both five-wire resistive and capacitive systems.

It is sometimes advantageous to have both a drive line and a sense line connection between the electronics and each of the four corner connection points. With appropriate feedback loops in the electronics, the combination of drive and sense lines gives the controller electronics better control over the voltages applied to the corner connection points. This leads to a variant of "five-wire" touchscreens that includes nine wire connections between the electronics and the touchscreen, otherwise known as a nine-wire touchscreen. The design of the peripheral electrode pattern is largely unaffected by the choice between five-wire and nine-wire connection schemes. Both involve four corner connection points on the substrate at which voltages are applied to a peripheral electrode pattern.

The use of separate drive and sense lines also leads to a variant of 4-wire touchscreens, namely the "8-wire" resistive touchscreen such as those sold by Gunze USA of Austin, Tex. and 3M Touch Systems, Inc. For example, if zero and 5 volts are applied to a pair of drive lines that excite a voltage gradient on a resistive coating, voltage drops on the drive lines may lead to a reduced total voltage drop across the resistive coating, say from 0.2 to 4.8 volts. Furthermore, if the drive line voltage drops vary with aging or environmental conditions, the relationship between touch position and measured voltages will also vary. However, by monitoring voltages on sense lines, such variations can be tracked and accounted for with linear corrections to the raw measured touch coordinates.

Rather than manufacturing touchscreens to exacting standards, corrections may be applied to touchscreen data in order to compensate for manufacturing variations and non-ideal material properties. Two types of corrections can be used: linear and non-linear. Resistive and capacitive touchscreens, in which X and Y voltage gradients are alternately applied to a common resistive coating, are often designed to be "linear." That is, during the measurement of a voltage in the horizontal or X direction, equipotential lines on the resistive coating are substantially straight, vertical, and uniformly spaced. During the measurement of a voltage gradient in the vertical or Y direction, the equipotential lines are also substantially straight and uniformly spaced, but are horizontal. If the equipotential lines are not straight and uniformly spaced in either the X direction or the Y direction, then the touchscreen is deemed to be non-linear. The design and manufacture of linear touchscreens involves satisfying these linearity conditions to a good approximation despite manufacturing variations. While linear touchscreens minimize the computational burden on the controller electronics, significant constraints are placed on the design and manufacture of linear touchscreens.

It is possible to have a non-linear touchscreen, and yet have a linear touchscreen system. In this case, the controller electronics or driver software on a host computer must apply non-linear corrections to the raw touchscreen measurements. As the cost of electronics and information processing software continues to drop, it becomes attractive to move the burden of linear system-level performance more towards the electronics and software.

A key issue of non-linear touchscreen systems is the determination of non-linear parameters. One can calibrate a non-linear touchscreen by mechanically touching an appropriate grid of points at known positions. However, this is a significant addition to the touchscreen manufacturing process or the touchscreen system installation process which inevitably adds cost. Alternatively, one can use a fixed set of non-linear correction parameters and ensure that each touchscreen is manufactured with the same non-linear distortions. However, this leads to similar tolerance requirements as in the manufacturing process for linear touchscreens and therefore inevitably adds cost. Thus, there is a need for an improved method for determining non-linear correction parameters for touchscreen systems.

Non-linear corrections are generally fixed constants in prior systems. As a consequence, non-linear distortions that vary with time or with changes in environmental conditions are problematic and limit the choice of materials and manufacturing processes for touchscreens. Thus, there is also a need for a convenient and automatic means to update the non-linear parameters and to track changes in non-linear distortions that occur with time and with changes in environmental conditions.

SUMMARY OF THE INVENTION

The present invention provides a way to measure and track non-linear corrections in touchscreens. Some or all of the relevant non-linear corrections may be determined using various types of circuitry. Production floor test equipment may make electronic measurements, compute parameters, and load the parameters in non-volatile memory of the controller electronics. Alternatively, controller electronics can make the electronic measurements and determine non-linear parameters. The latter embodiment of the invention permits the determination of non-linear parameters in the field, dynamically tracking changes in the non-linear characteristics of installed touchscreens that occur over time or due to environmental conditions.

According to a first aspect of the present invention, a touchscreen system for generating touch coordinates is provided. The touchscreen system includes a touchscreen, a correction-parameter circuit and a correction-application circuit. The touchscreen generates touch information in response to a touch and generates measurable information indicative of a given electrical characteristic in the touchscreen. The correction-parameter circuit is in communication with the touchscreen, wherein the correction-parameter circuit receives the measurable information and generates a non-linear correction parameter. The correction-application circuit is in communication with the touchscreen and the correction-parameter circuit and receives the touch information and the non-linear correction parameter and corrects for non-linearity in the touchscreen.

According to another aspect of the present invention, a touchscreen system for generating signals representing a touch position is provided. The touchscreen system includes a substrate having four corners and a corner contact at each corner and a digitizing circuit in communication with each corner contact. The digitizing circuit measures an electrical characteristic of one contact and generates measurable information based upon the electrical characteristic. The touchscreen system also includes a correction-parameter circuit in communication with the digitizing circuit. The correction-parameter circuit generates a non-linear correction parameter.

According to another aspect of the present invention, a method for correcting non-linearities in a touchscreen is provided. The touchscreen includes a first point spaced apart from a second point. The method includes measuring an electrical characteristic of the first point while applying one of a voltage or current to the second point and generating measurable information based upon the electrical characteristic. The method also includes correcting for non-linearity in the touchscreen system using the measurable information.

According to another aspect of the present invention, a touchscreen system for generating signals representing a touch position is provided. The touchscreen system includes a substrate including a first contact spaced apart from a second contact and a first coating overlying the substrate and in communication with the first and second contacts. The touchscreen system also includes a sheet spaced from the substrate, wherein the sheet includes a second coating facing the first coating, wherein the sheet is movable from a first position, in which the second coating is not in contact with the first coating, to a second position, in which the second coating is in contact with the first coating. The touchscreen system also includes a digitizing circuit in communication with both the first and the second contacts, wherein the digitizing circuit receives first analog measurable information and generates digital measurable information in response, and wherein the digitizing circuit receives the analog measurable information when the sheet is in the first position. The touchscreen system also includes a correction-parameter circuit and a correction-application circuit. The correction-parameter circuit is in communication with the digitizing circuit, wherein the correction-parameter circuit receives the digital measurable information and generates a correction parameter based upon the digital measurable information. The correction-application circuit receives the correction parameter and corrects for non-linearity in the touchscreen system using the correction parameter.

According to another aspect of the present invention, a method for correcting non-linearities in a touchscreen is provided. The touchscreen includes a substrate and a sheet spaced from the substrate. The substrate includes a first contact spaced apart from a second contact and a first coating overlying the substrate and in communication with the first and second contacts. The sheet includes a second coating facing the first coating, wherein the sheet is movable from a first position, in which the second coating is not in contact with the first coating, to a second position, in which the second coating is in contact with the first coating. The method includes measuring an electrical characteristic of the first contact, while applying one of a voltage or current to the second point, when the sheet is in the first position, generating measurable information based upon the electrical characteristic, and correcting for a non-linearity in the touchscreen system using the measurable information.

According to another aspect of the present invention, a touchscreen system for generating signals representing a touch position is provided. The touchscreen system includes a touchscreen and a digitizing circuit in communication with the touchscreen, wherein the digitizing circuit receives analog measurable information and generates digital measurable information in response. The touchscreen system also includes a correction-parameter circuit in communication with the digitizing circuit, wherein the correction-parameter circuit corrects for a non-linearity in the touchscreen using the digital measurable information.

According to another aspect of the present invention, a method for correcting non-linearities in a touchscreen is provided. The method includes measuring an electrical characteristic of the touchscreen, wherein the electrical characteristic has a value, and correcting for a non-linearity in the touchscreen system using the value for the electrical characteristic.

Figure 1:
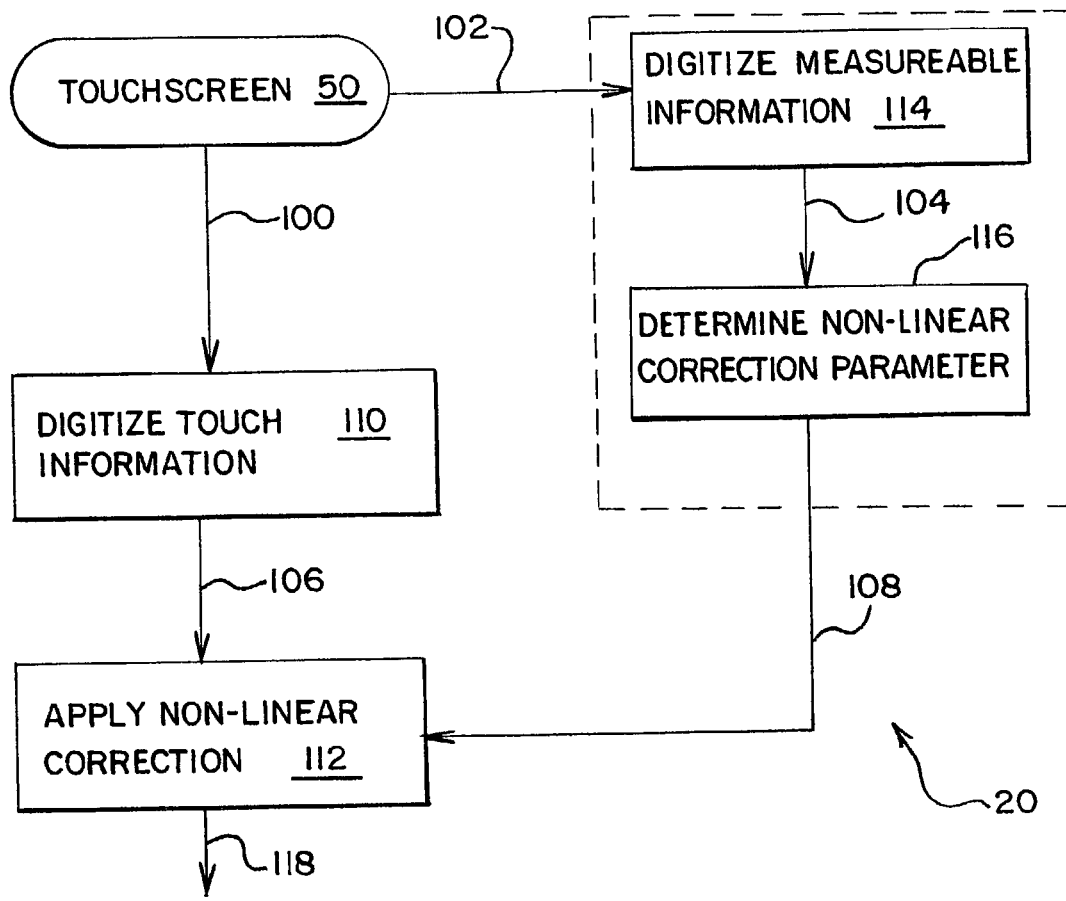
FIG. 1 is a flow chart illustrating the operation of a touchscreen system, according to an embodiment of the present invention.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION OF THE PRESENTLY PREFERRED EMBODIMENTS

FIG. 1 is a flowchart illustration of a method according to the invention. It will be understood that certain blocks of the flowchart, and combinations of blocks in the flowchart, can be implemented in an apparatus (system) or by computer program instructions. These computer program instructions may be loaded onto a computer or other programmable data processing apparatus to produce a machine, such that the instructions which execute on the computer or other programmable data processing apparatus create a means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture, such as, instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 2:
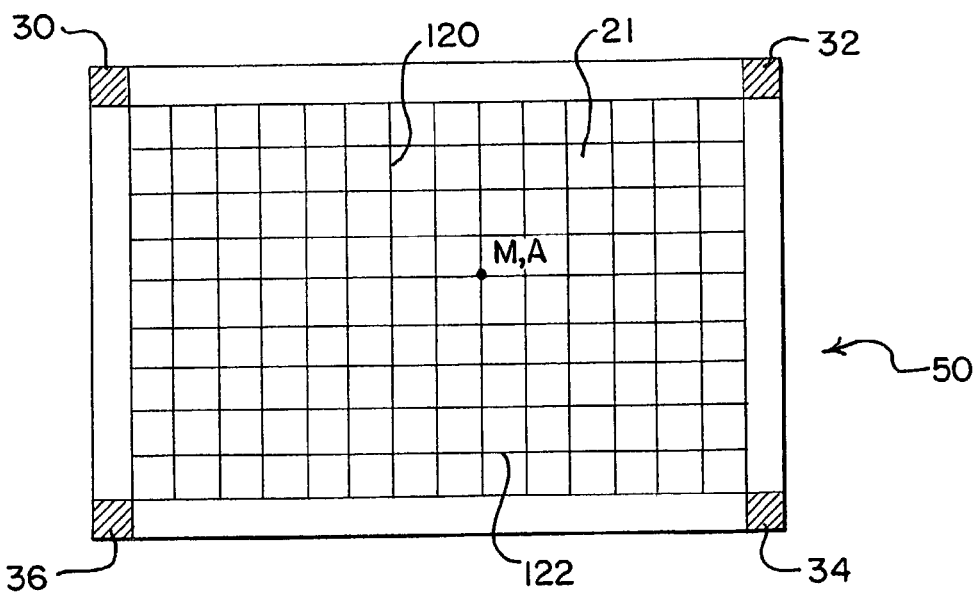
FIG. 2 is a plan view of a touchscreen having initial equipotential lines, according to an embodiment of the present invention.
Figure 3:
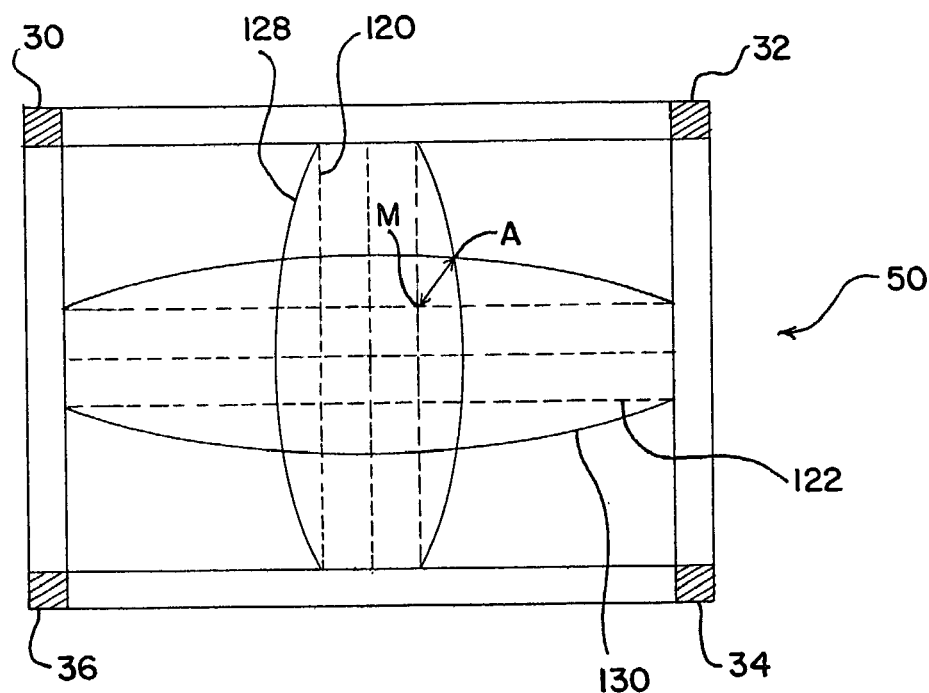
FIG. 3 is a plan view of the touchscreen of FIG. 2 having initial and distorted equipotential lines, according to an embodiment of the present invention.
Figure 4:
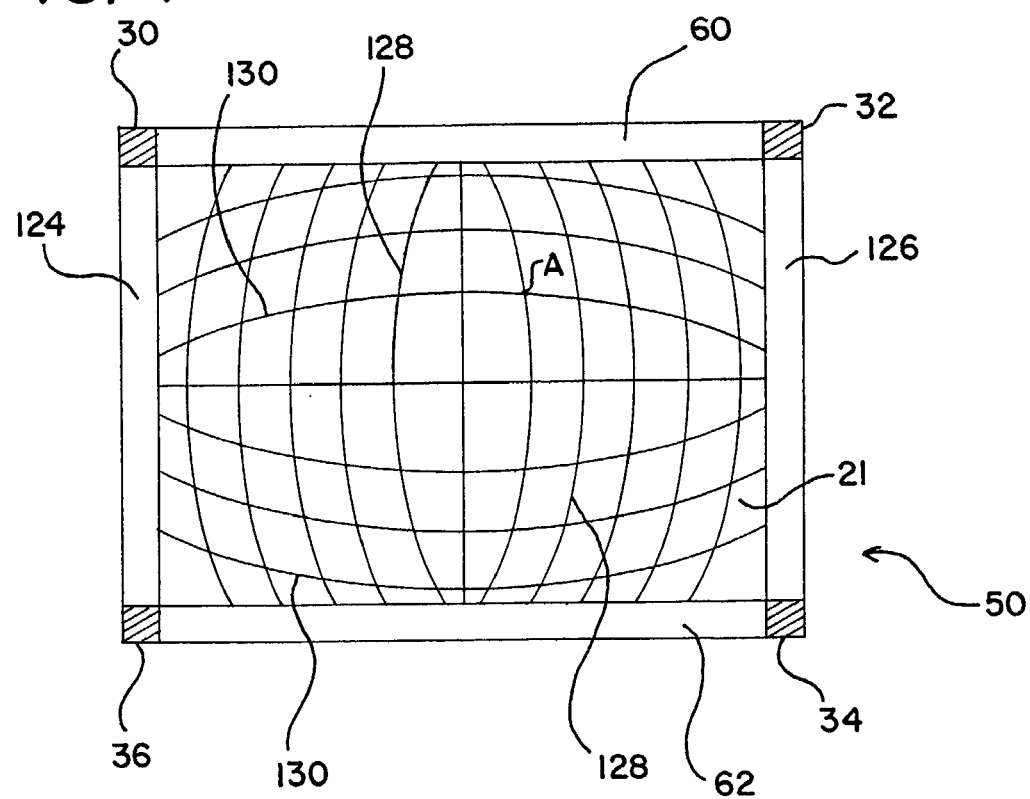
FIG. 4 is a plan view of the touchscreen of FIG. 2 having distorted equipotential lines, according to an embodiment of the present invention.

As seen in FIGS. 1 and 2, a touchscreen 50 generates touch information 100 in response to a touch and generates measurable information 102 upon monitoring a given electrical characteristic. The touchscreen 50 can be any one of a number of types of touchscreens, such as, for example, a five-wire resistive touchscreen, a nine-wire resistive touchscreen, or a capacitive touchscreen. Initially, touchscreen 50 is nearly linear, as illustrated in FIG. 2. Voltage gradients are generated in touchscreen 50 having initial vertical equipotential lines 120 and initial horizontal equipotential lines 122. The initial equipotential lines 120, 122 are lines across a touch area 21 of the touchscreen 50, wherein each point in the initial equipotential lines 120, 122 is at the same voltage potential at some point in time. So, for example, if horizontal coordinates for a touch position are sought, then a voltage $V_0$ is applied to corner contacts 32 and 34 of the touchscreen 50 and corner contacts 30 and 36 are grounded resulting in initial vertical equipotential lines 120. Additionally, if vertical coordinates for a touch position are sought, then a voltage $V_0$ is applied to contacts 30 and 32 of the touchscreen 50 creating the initial horizontal equipotential lines 122. If a non-linear distortion is introduced into the touchscreen 50, the touchscreen 50 generates a voltage gradient having distorted vertical equipotential lines 128 and distorted horizontal equipotential lines 130, as illustrated for example in FIGS. 3 and 4. The curvatures of the distorted equipotential lines 128, 130 may differ from the curvatures of the initial equipotential lines 120, 122, as illustrated in FIG. 3, due to the non-linear distortion introduced into the touchscreen 50. Non-linear distortions introduced into the touchscreen 50 by design or may be caused by one of many things, such as, irregularities in the manufacturing of the touchscreen 50 or changes in environmental conditions.

The touchscreen 50 generates touch information 100 in response to a touch at a position A. In one embodiment, the touch information 100 is an analog signal which is later converted to a digital signal known as digital touch information 106, as discussed below. The touch information 100 represents, for example, a measured position M of the touch and contains information, such as the voltages of the actual vertical and horizontal equipotential lines at the touch position A. Alternatively, measured touch position M may be read out by injecting current into the substrate 22 at the touch position A and measuring the resulting currents at the corner contacts 30, 32, 34, and 36. In this case, equipotential lines 120 are interpreted as a line of equal ratio of the sum of currents of the right contacts 32 and 34 to the sum of currents of all corner contacts 30, 32, 34, and 36, and similarly equipotential lines 122 are interpreted as the fraction of injected current going through the upper corner contacts 30 and 32. Initially, the equipotential lines 120, 122 appear linear to the touchscreen system 20, and therefore the measured position M and actual position A are at the same point, as illustrated in FIG. 2. The value for the measured position M may vary from the value for an actual position A of the touch if non-linear distortions are introduced into the touchscreen and change the curvatures of the initial equipotential lines 120, 122, as illustrated in FIG. 3. If the measured position M varies from the actual position A due to a non-linear distortion introduced into the touchscreen 50, then a non-linear correction should be applied to the digital touch information 106 in order to compensate for this non-linear distortion and to determine the actual position A of the touch, as described below. A non-linear correction 112 is performed on the digital touch information 106 in order to compensate for any non-linear distortion introduced into the touchscreen 50 so that the corrected measured position 118 accurately represents the actual position A.

The touchscreen 50 also generates measurable information 102 based upon a given electrical characteristic, and more specifically, upon monitoring the electrical characteristic of the substrate of the untouched touchscreen, wherein the measurable information 102 represents the value of the monitored electrical characteristic or a plurality of monitored electrical characteristics. The electrical characteristic may be a variety of electrical conditions, such as resistance, capacitance, voltage, or current. Preferably, the electrical characteristic of one corner contact, such as corner contact 30, is measured while at least one voltage or current is supplied to the remaining corner contacts, such as corner contacts 32, 34, and 36. For example, the touchscreen 50 may generate measurable information 102 upon monitoring the voltage of a corner contact, such as corner contact 30, while voltages are applied to corner contacts 32, 34, and 36. As another example, the voltage at corner contact 36 may be monitored and then measured as a voltage $V_0$ is applied to corner contact 32 and contacts 30 and 34 are grounded. Additionally, a first current at corner contact 36 may be monitored and measured as a second current is applied to corner contact 32 and no current is supplied to contacts 30 and 34. In one embodiment, the measurable information 102 is an analog signal which is later converted to a digital signal known as digital measurable information 104, as discussed below. The digital measurable information 104 is used to determine a correction parameter 108 which is later used for applying a non-linear correction to the digital touch information 106.

Referring to FIG. 1, the touch information 100 and the measurable information 102 are preferably analog signals which are then later converted to digital signals in blocks 110 and 114 and output from blocks 110 and 114 as digital touch information 106 and digital measurable information 104, respectively. At a minimum, blocks 110 and 114 contain an analog-to-digital converter. Optionally, blocks 110 and 114 may contain additional analog circuitry to buffer, amplify, filter, or otherwise condition the analog signals of the touch information 100 and the measurable information 102 that are later digitized.

The digital touch information 106 enters block 112, and a non-linear correction is then applied to the digital touch information 106 in order to compensate for non-linear distortions introduced into the touchscreen 50 so that the value of the corrected measured position 118 is closer to or coincident with the value of the actual position A. The digital measurable information 104 enters block 116 and then is used to determine a non-linear correction parameter or parameters 108 which is then applied to the digital touch information 106. The correction parameter 108 then enters block 112 and is used to apply a non-linear correction to the digital touch information 106 in order to correct for non-linear distortions introduced into the touchscreen 50, as described above.

Upon correcting for non-linear distortions found in the touchscreen 50, as shown in block 112, touch coordinates 118 are then obtained. The touch coordinates 118 more accurately represent the actual position A than the touch information 100, which represents the measured position M. The touch coordinates 118 may then be used by an electronics device to determine the actual position of the touch. An electronics device is any device that may use a touchscreen 50, such as a personal digital assistant, a cash register, a personal computer, a global positioning system (GPS) unit, an automobile navigation system, an airplane ticketing kiosk, a watch, a portable audio player, or a telephone.

Figure 6:
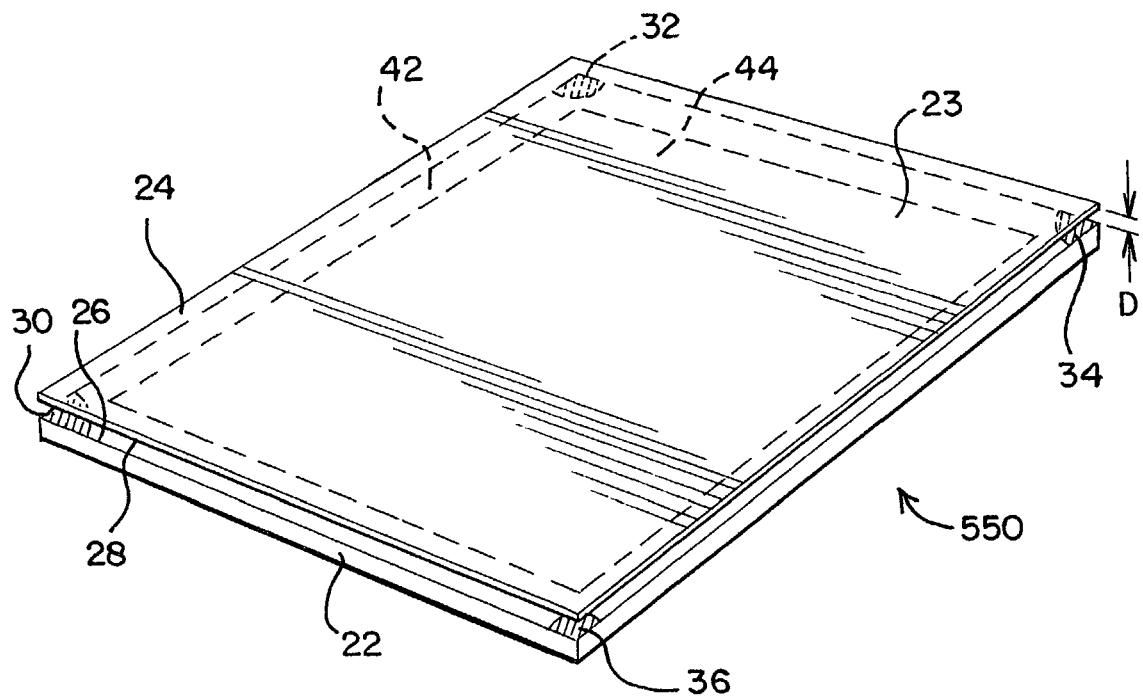
FIG. 6 is a perspective view of a touchscreen, according to an embodiment of the present invention.
Figure 7:
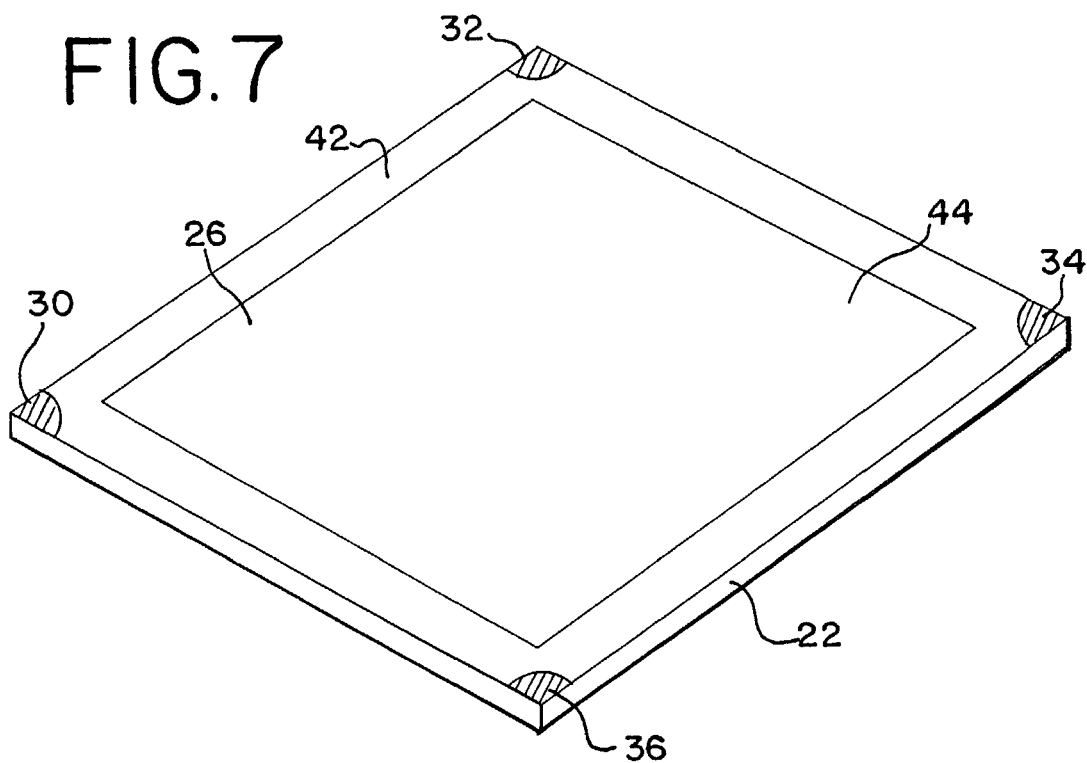
FIG. 7 is a perspective view of a substrate of the touchscreen of FIG. 6.

FIGS. 6 and 7 illustrate a touchscreen 550 that is one preferred embodiment of a touchscreen 50. As illustrated in FIG. 6, touchscreen 550 includes a substrate 22 underlying a sheet 24, a first coating 26 on the substrate 22, and a second coating 28 on the sheet 24 facing the first coating 26. Preferably, the substrate 22 is generally rectangular and includes first, second, third, and fourth contacts 30, 32, 34 and 36, one of which is positioned at each corner of the substrate 22. Preferably, the substrate 22 comprises a generally rigid material, such as, glass or hardened plastic. Preferably, the first coating 26 coats one side of the substrate 22, and is a resistive coating, such as, tin-oxide, indium-tin-oxide, or a conductive polymer. The sheet 24 is spaced a distance D from the substrate 22, as illustrated in FIG. 6. Preferably, the sheet 24 comprises a generally flexible material, such as, plastic, glass microsheet, or a lamination containing glass and polymer materials. The sheet 24 includes the second coating 28 on a side of the sheet 24 facing the first coating 26 and the touch surface 23 on an opposite side of the sheet 24, as illustrated in FIG. 6. The sheet 24 is movable from a first position, in which the second coating 28 is not in contact with the first coating 26, to a second position, in which the second coating 28 is in contact with the first coating 26 at the touch position. The sheet 24 moves from the first position to the second position when pressure is applied to the sheet 24 as a result of a touch, and the sheet 24 flexes, thus causing the first coating 26 to come into contact with the second coating 28. Preferably, the second coating 28 is a resistive coating.

As shown in FIG. 7, the first coating 26 includes an interior region 44 having a resistivity and an exterior region 42. The exterior region 42 borders and surrounds the interior region 44. In one embodiment, the exterior region 42 includes the corner contacts 30, 32, 34, 36, as illustrated in FIGS. 6 and 7. The exterior region 42 may contain any of a variety of structures as desired to better shape the equipotential lines within interior region 44. Possible field shaping structures include, but are not limited to, those taught in PCT Application No. WO/98/19283 A1 to Hurst, Ritchie, Bouldin, and Warmack; U.S. Pat. No. 4,220,815 to Gibson; U.S. Pat. Nos. 4,661,655 and 4,731,508 to Gibson et al.; U.S. Pat. No. 4,822,957 to Talmadge et al.; U.S. Pat. No. 5,045,644 to Dunthorn; and U.S. Pat. No. 4,371,746 to Pepper, the specifications of which are all herein incorporated by reference. Preferably, the corner contacts 30, 32, 34, 36 are located at or near the corners of exterior region 42 and provide for electrical connection to circuits external to the touchscreen.

Figure 8:
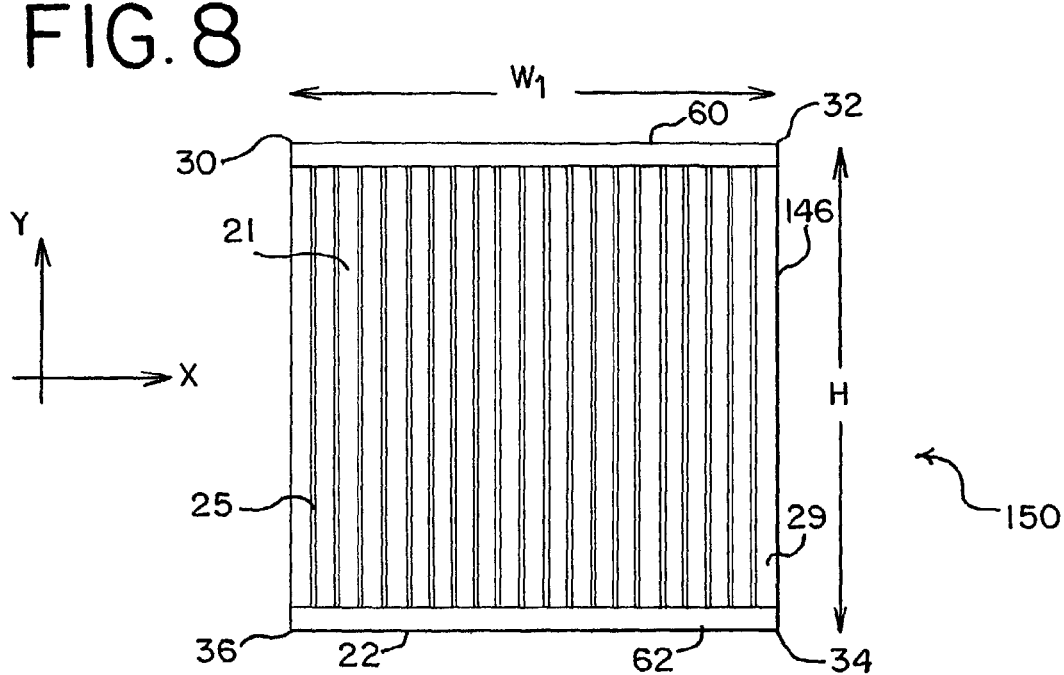
FIG. 8 is a plan view of a substrate of a touchscreen, according to an embodiment of the present invention.
Figure 9:
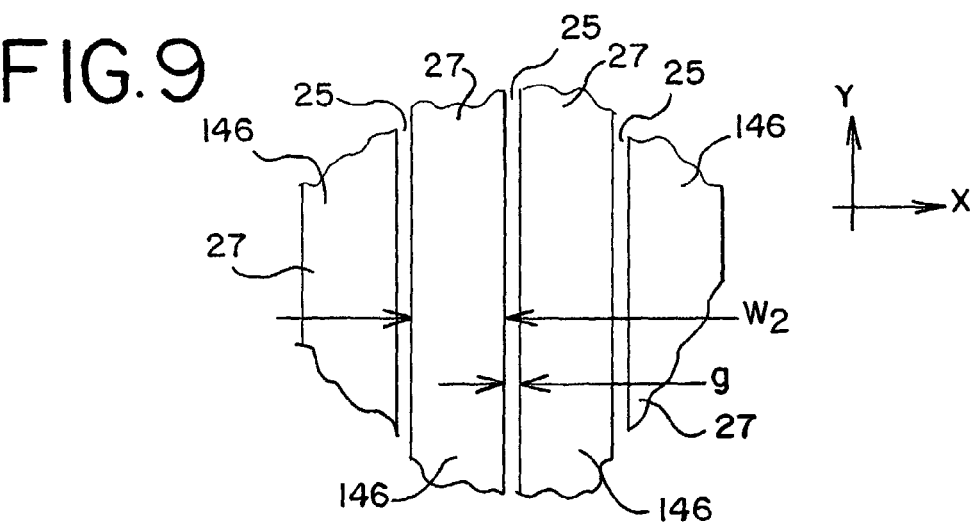
FIG. 9 is an enlarged plan view of the substrate of FIG. 8, according to an embodiment of the present invention.

While the present invention applies to a broad range of touchscreens 50, as described above, the following example provides a quantitative illustration of the concepts of the invention. Referring to FIGS. 8 and 9, a touchscreen 150 is shown having substrate 22 with touch area 21 which the user touches. The substrate 22 includes a substantially transparent, resistive first coating 146. The substrate 22 may comprise glass, for example, and the first coating 146 may comprise tin-oxide, for example. The first coating 146 does not uniformly cover the substrate 22, but rather is fabricated in a closely spaced striped pattern, as illustrated in FIGS. 8 and 9. Preferably, the first coating 146 comprises a plurality of strips 27 made of a first material, such as tin-oxide, and wherein the substrate 22 further comprises a gap 25 in between each pair of strips 27, wherein the gap 25 does not comprise the first material. Preferably, the gap 25 comprises a second material which is an insulative material, such as air. The shaded regions represent strips 27 of the first coating 146 while the gaps 25 in between represent areas where no first coating 146 is applied. As used herein, $W_2$ is the width of the strips 27. In one embodiment, for example, $W_2$ is between 0.50 and 2 mm. The gaps 25 between the strips 27 represent insulating regions where the first coating 146 is either removed from or was never applied to the substrate 22. As used herein, g is the width of these gaps 25, which, for example, may be between 0.05 and 0.2 mm. As used herein, $\rho_0$ is the resistivity (Ohms/square) of the first coating 146. In the Y direction, as illustrated in FIGS. 8 and 9, the averaged resistivity becomes $\rho_0' = (1+g/W_2)*\rho_0$.

Large sheets of such a substrate material with a striped resistive coating may be cut into touchscreen-sized pieces of height H and width $W_1$, as illustrated in FIG. 8. The four dark squares represent the four contacts 30, 32, 34, 36. The top contacts 30, 32 connect to the ends of a first linear resistor 60 of total resistance R. The bottom contacts 34, 36 similarly connect to a second linear resistor 62 of total resistance R. The first and second linear resistors 60, 62 could, for example, comprise a printed bar of conductive composite polymer ink. The contacts 30, 32, 34, 36 and the two linear resistors 60, 62 are in electrical contact with the ends of each strip 27 of the resistive coating 146.

The above-described touchscreen design, as illustrated in FIGS. 8 and 9, will provide a touchscreen 150 that is linear in the horizontal or X direction. Once appropriate voltages are applied to the contacts 30, 32, 34, 36 of the touchscreen 150, linear voltage gradients will be generated on the top and bottom linear resistors 60, 62. For example, zero volts may be applied to each of the left two contacts 30, 36 and 5 volts may be applied to each of the right two contacts 32, 34. This provides the correct boundary conditions for a linear voltage gradient in the X direction in the touch area 21. Each strip 27 will be at a constant potential and each strip 27 differs from a neighboring strip 27 by substantially the same voltage difference. With current injection read-out, linearity in the X direction is also provided.

Because of current flow through the linear resistors 60, 62, the voltage gradient in the Y direction for the above-described touchscreen design will be non-linear. A key correction parameter β quantifying the non-linearity of the voltage gradient in the Y direction can be defined as follows:

$$\beta = (R/2)/(\rho_0' * H/W_1) \quad [1]$$

Wherein β is the ratio of the total resistance of the touchscreen 150 in the X direction to the total resistance of the touch area of touchscreen 150 in the Y direction. The horizontal resistance of the touchscreen 150 is the combined parallel resistance of the top and bottom linear resistors 60, 62, i.e. R/2. This would be the resistance measured by an ohmmeter if the two left contacts 30, 36 would be connected to each other and the two right contacts 32, 34 would also be connected to each other. The vertical resistance of the touch area of the touchscreen 150 is $\rho_0'*H/W_2$ where $\rho_0'$ is the ohms per square of the first coating 146, $\rho_0$, corrected for the slight increase in resistance due to the removed coating in the gaps 25.

A coordinate system can be defined in which the center of the touchscreen 150 is taken as both the origin (x,y)=(0,0)

and "ground" or zero voltage. For generation of voltage gradients in the Y direction, the top contacts 30, 32 at $(x,y)=(\pm W_1/2, H/2)$ are provided with a voltage $+V$ and the bottom contacts 34, 36 at $(x,y)=(\pm W_1/2, -H/2)$ are provided with a voltage $-V$. It can be mathematically shown that the resulting non-linear voltage gradient generated in the Y direction is given by the following equation.

$$V_y(x,y) = V^*(2y/H)^* [\cos h(\beta^{1/2}(2x/W_1))/\cos h(\beta^{1/2})] \quad [2]$$

In the mathematical limit that the non-linear correction parameter $\beta$ approaches zero, this equation approaches the simple linear voltage gradient $V_y(x,y)=V^*(2y/H)$. In the limit that $W_2$ is very small when compared with $W_1$, the horizontal resistance of the touchscreen 150 is simply the combined parallel resistance of the top and bottom linear resistors 60, 62. At the top (bottom) center of the touchscreen 150, at $(x,y)=(0,\pm H/2)$, the distortion in the Y direction reaches its maximum value, to first order of $\beta$, of $(\beta/4)^*H$. Thus, if the resistance R of the first and second linear resistors 60, 62 is made very small relative to the resistivity of the first coating 146, the touchscreen 150 effectively becomes linear. For example, if $\beta < \frac{1}{25}$, the touchscreen 150 will become linear to better than $\pm 1\%$. While this avoids the need for non-linear corrections, a very low value of the resistance R of the first and second linear resistors 60, 62 is undesirable since it would increase the power requirements of the touchscreen 150 and/or increase the susceptibility of the touchscreen 150 to electronic noise. At a system level, it is of interest to consider much larger values of the non-linear correction parameter $\beta$.

For example, for a value of $\beta=1$, the generation of voltage gradients in the Y direction is significantly distorted. Again the maximum distortion is at $(x,y)=(0,\pm H/2)$, with $V_y(0,H/2)$ dropping from V to $0.648^*V$, i.e. by 35%, due to non-linear distortion. The corresponding error in the measurement of touch position along the Y direction corresponds to about 18% of the height H of the touchscreen 150. This level of error would be unacceptable in a touchscreen system, and thus, non-linear corrections would be required. Provided that the non-linear correction parameter $\beta$ is known, these non-linear corrections can determined by inverting the following pair of simultaneous equations relating the true touch position $(x,y)$ to the raw measured coordinates $(x',y')$ with no non-linear correction applied.

$$x'=x \quad [3]$$

$$y'=H^*V_y(x,y)/2V=y^*[\cos h(\beta^{1/2}(2x/W_1))/\cos h(\beta^{1/2})] \quad [4]$$

The inverted equations are as follows.

$$x=x' \quad [5]$$

$$y=y'^*\cos h(\beta^{1/2})/\cos h(\beta^{1/2}(2x'/W_1)) \quad [6]$$

For algorithm development one has the option to avoid the transcendental hyperbolic cosine function by appropriate use of polynomial expansions, look-up tables, linear extrapolations, etc.

The parameter $\beta$ can be determined from the measurables $R_X$ and $R_Y$. As used herein, $R_X$ is the resistance of the touchscreen 150 measured in the X direction. To determine $R_X$, we would have the two left contacts 30, 36 electrically connected to each other and the two right contacts 32, 34, likewise, electrically connected to each other, and the left and rights contacts 30, 32, 34, 36 all connected to an ohmmeter or circuit of equivalent function. The resistance $R_X$ would then simply be the parallel resistance of the top and bottom linear resistors 60, 62.

$$R_X=R/2 \quad [7]$$

As used herein, $R_Y$ is the resistance of the touchscreen 150 measured in the Y direction. To determine $R_Y$, we would have the two upper contacts 30, 32 electrically connected to each other and the two bottom contacts 34, 36, likewise, electrically connected to each other, and the upper and lower contacts 30, 32, 34, 36 all connected to an ohmmeter of circuit of equivalent function. For ease of calculation, let us assume that the ohmmeter applies a voltage $+V$ on the top contacts 30, 32 and a voltage $-V$ on the bottom contacts 34, 36. Using the above formula for $V_y(x,y)$, we can calculate the current entering, say the upper left electrode.

$$I=-\partial V_y/\partial x(-W_1/2, H/2)/(R/W_1)=V^*2\beta^{1/2}\tan h(\beta^{1/2})/R \quad [8]$$

Because corners are paired, the ohmmeter current is 2I for an applied voltage 2V, and hence the resistance in the Y direction is as follows.

$$R_Y=(2V)/(2I)=R/(2\beta^{1/2}\tan h(\beta^{1/2})) \quad [9]$$

Note that in the limit that $\beta \to 0$, the linear resistors R become conducting bus bars, and $R_Y \to \rho_0'^*H/W_1$ as expected.

Now consider the ratio of the X and Y resistances.

$$R_X/R_Y=\beta^{1/2}\tan h(\beta^{1/2})=\beta-\beta^2/3\pm \quad [10]$$

Equation [10] can easily be used to construct a look-up table for $\beta$ as a function of the measured ratio $R_X/R_Y$. Thus with ohmmeter measurements of $R_X$ and $R_Y$, the non-linear correction parameter $\beta$ can be determined and hence non-linear corrections may be properly applied to the touchscreen 150.

Note that the non-linear correction parameter $\beta \equiv (R/2)/(\rho_0'^*H/W_1)$ depends on the resistance, R, of the first and second linear resistors 60, 62, the resistivity $\rho_0$ of the first coating 146, as well as the width g of the gaps 25 (recall that $\rho_0'=(1+g/w)^*\rho_0$). All these factors are subject to manufacturing variations. For example, if the linear resistors 60, 62 are formed of screen-printed conductive inks, the resistance R may vary due to the print height, the print width, and variations in the resistivity of the ink. The resistivity $\rho_0$ of the first coating 146 may vary due to variations of the coating thickness and the electronic properties of materials used in the first coating 146. The width g of the gaps 25 may also be subject to manufacturing variations. In many cases, these manufacturing parameters may tend to be quite uniform within a single touchscreen 150, but drifts in the manufacturing process may lead to part-to-part variation of these manufacturing parameters. In such cases, the value of $\beta$ may be subject to significant manufacturing variations, but remains the only significant non-linear correction parameter.

Referring to FIG. 1, touchscreen 50 may contain a substrate 22 with a resistive coating 26 and a plurality of corner contacts 30, 32, 34, and 36. Additionally, touchscreen 50 may be of another design, as described below. While four corner contacts 30, 32, 34, 36 are described, touchscreen 50 may contain any number of substrate contacts.

Figure 17:
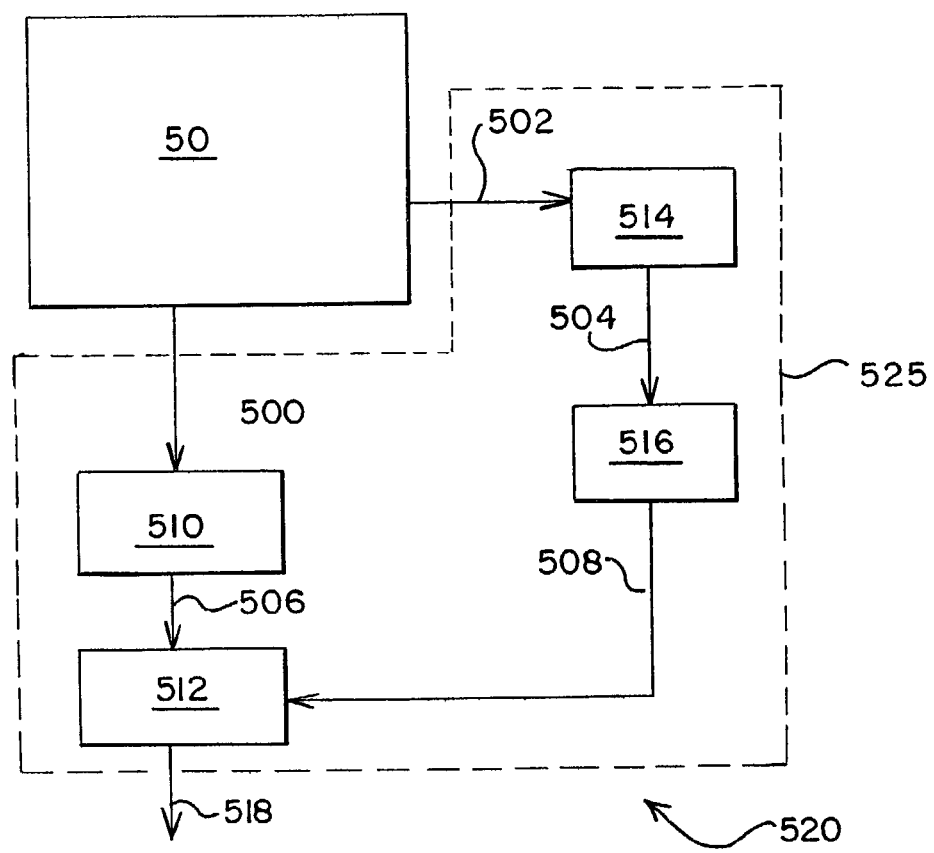
FIG. 17 is a schematic view of a touchscreen system, according to an embodiment of the present invention.

In one embodiment, blocks of FIG. 1 are embodied as hardware circuits in controller electronics 525 of a touchscreen system 520, as illustrated in FIG. 17. In this embodiment, touchscreen system 520 includes a touchscreen 50 and the controller electronics 525. The controller electronics 525 are attached to the touchscreen 50 and are essential for the operation of the touchscreen 50. Preferably, the controller electronics 525 are fixedly attached to the touchscreen 50, so that they remain with the touchscreen 50 when the touchscreen 50 is in actual use outside of the production floor. The controller electronics 525 are intended to be a permanently attached to the touchscreen 50. The use of controller electronics 525 permits the determination of correction parameters 108 in the field, dynamically tracking changes in the non-linear characteristics of installed touchscreens 50 that occur over time or due to environmental conditions.

The controller electronics 525 include digitizing circuits 510 and 514, correction-parameter circuit 516, and a correction-application circuit 512 which all correspond in function to blocks 110, 114, 116 and 112, respectively. In this embodiment, touchscreen system 520 determines a non-linear correction parameter 508 as follows. Digitizing circuit 514 is in communication with the touchscreen 50, and by applying voltages or inject currents or by other electronic means, measures electronic characteristics of the touchscreen 50. Preferably, such measurements are performed when the touchscreen 50 is not being touched. In this manner, analog measurables information 502 concerning the electronic characteristics of touchscreen 50 is transmitted to digitizing circuit 514.

As defined herein, devices or circuits that are "in communication with" each other, are devices or circuits in which information is transmitted from one devices to the second, using a variety of different transmission techniques, such as, but not limited to, wireless transmission, electronic transmission through cables, optical transmission through optical cables, a combination of wireless, electronic, and optical transmission, or any other transmission technique which allows for devices to communicate or transfer information between each other. Additionally, devices or circuits with are "in communication with" each other do not necessarily transmit information in one direction. Information may be transmitted bi-directionally between devices.

Digitizing circuit 514 then converts the analog measurables information 502 to digital measurables information 504 and transmits the digital measurables information 504 to correction-parameter circuit 516. Correction parameter circuit 516 in turn generates the non-linear correction parameter 508, using the digital measurables information 504, and transmits the non-linear correction parameter 508 to correction-application circuit 512 which applies a non-linear correction to the digital touch information 506 in to determine linear touch coordinates 518.

As shown in FIG. 17, touchscreen system 520 determines linear touch coordinates 518 as follows. Digitizing circuit 510 is in communication with the touchscreen 50. If touchscreen 50 is a resistive touchscreen, digitizing circuit 510 will preferably also be in communication with a sheet 24 of the touchscreen 50. When the touchscreen 50 is being touched, digitizing circuit 510 probes the touch condition of the touchscreen 50 by applying voltages or by injecting currents or by other electronic means. In this manner, analog touch information 500 concerning the touch location is transmitted to digitizing circuit 510. Digitizing circuit 510 converts the analog touch information 500 to digital touch information 506 and transmits the digital touch information 506 to correction-application circuit 512. The digitizing circuit 510 includes an analog to digital converter which is used to convert analog touch information 500 to digital touch information 506. Digitizing circuit 510 then transmits the digital touch information 506 to correction-application circuit 512. Correction application circuit 512 applies a non-linear correction to the digital touch information 506 using non-linear correction parameter 508 received from correction-parameter circuit 516. In this fashion, the touchscreen system 520 as a whole can act as a linear touchscreen system even if the touchscreen 50 is not linear.

Figure 18:
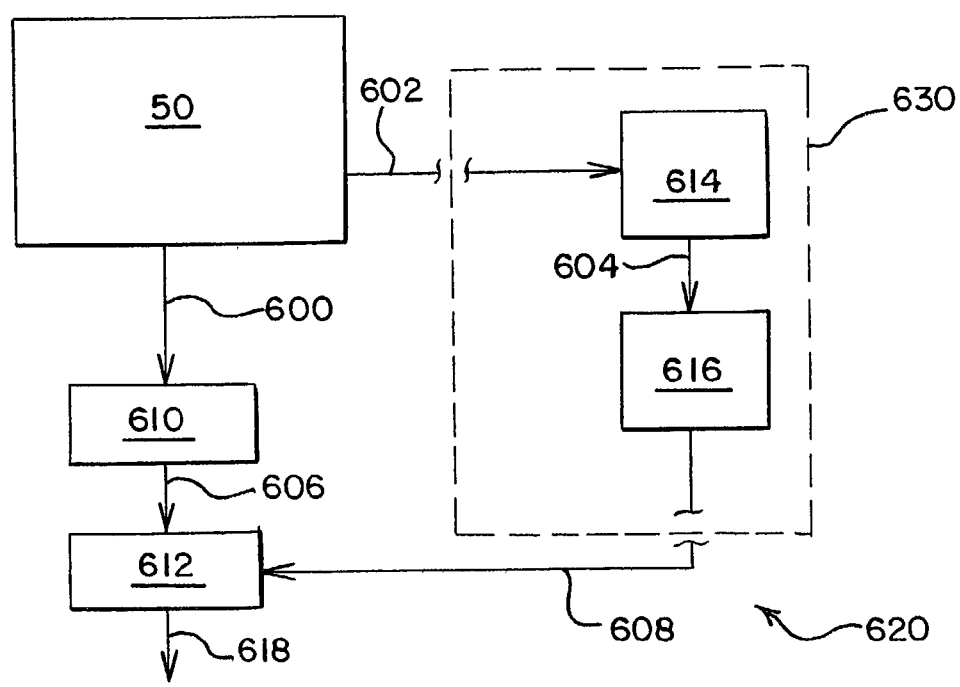
FIG. 18 is a schematic view of a touchscreen system, according to an embodiment of the present invention.

Herein the term "circuit" is used broadly. For example a circuit, such as circuits 512 and 516, may be dedicated custom designed electronic circuitry, but may also take the form of touchscreen driver software used by an operating system of a personal computer. For example, the Windows™ operating system may consider a touchscreen driver to be a type of mouse driver. Referring to FIG. 18, in some embodiments, a touchscreen system 620 is provided that includes a digitizing circuit 614 and a correction-parameter circuit 616, which correspond in function to blocks 114 and 116, respectively. The digitizing circuit 614 and the correction-parameter circuit 616 are used to determine a non-linear correction parameter 608, wherein the digitizing circuit 614 and the correction-parameter circuit 616 are only temporarily in communication with touchscreen 50. In this embodiment, touchscreen system 620 also includes a touchscreen 50, a digitizing circuit 610, and a correction-application circuit 612 which correspond in function to blocks 110 and 112, respectively. In this embodiment, touchscreen system 620 determines a non-linear correction parameter 608 as follows. Digitizing circuit 614 is in communication with the touchscreen 50, and by applying voltages or by injecting currents or by other electronic means, measures electronic characteristics of the touchscreen 50. Preferably, such measurements are performed when the touchscreen 50 is not being touched. In this manner, analog measurables information 602 concerning the electronic characteristics of touchscreen 50 is transmitted to digitizing circuit 614. Digitizing circuit 614 then converts the analog measurables information 602 to digital measurables information 604 and transmits the digital measurables information 604 to correction-parameter circuit 616. As a minimum, digitizing circuit 614 includes an analog to digital converter to convert analog measurables information 602, to a digital signal, that is digital measurables information 604. Correction-parameter circuit 616 in turn generates the non-linear correction parameter or parameters 608, using the digital measurables information 604, and transmits the non-linear correction parameter 608 to correction-application circuit 612 which applies a non-linear correction to the digital touch information 606 in order to determine linear touch coordinates 618. Analog touch information 600 concerning the touch location is transmitted to digitizing circuit 610. Digitizing circuit 610 converts the analog touch information 600 to digital touch information 606 and transmits the digital touch information 606 to correction-application circuit 612. Correction application circuit 612 applies a non-linear correction to the touch information 606 using non-linear correction parameter 608 received from correction-parameter circuit 616. In this fashion, the touchscreen system 620 as a whole can act as a linear touchscreen system even if the touchscreen 50 is not linear.

Since the digitizing circuit 614 and the correction-parameter circuit 616 are only temporarily in communication with touchscreen 50, they may be implemented in a variety of different ways. For example, digitizing circuit 614 and correction-parameter circuit 616 may be placed in production floor test equipment 630, as illustrated in FIG. 18. The production floor test equipment 630 then may either manually or automatically collect measurable information 602, such as $R_X$ and $R_Y$, as discussed above. Using measurable information 602, the production floor test equipment 630 is then able to determine appropriate non-linear correction parameters which may later then be loaded into an correction-application circuit 612, such as a non-volatile memory of a touchscreen controller product containing the correction-application circuit 612, or as a data file available to driver software including code to apply a non-linear correction 608 generated by correction-parameter circuit 616. Production floor test equipment 630 can be integrated into existing production line test equipment that can be electrically connected to the touchscreen 50.

By enabling a looser manufacturing tolerance for the non-linear correction parameters, such as β, as described above, the present invention can greatly loosen manufacturing tolerances and significantly increase design, material, and manufacturing process options. In the end, the present invention enables significant cost reduction in the manufacture and production of touchscreen systems and touchscreens 50.

While using production floor test equipment 630 has advantages, as described above, there are also significant advantages to moving circuits 614 and 616 from the production floor test equipment 630 to the installed touchscreen system 520. In this scenario, the circuits 514 and 516 can periodically measure and track non-linear correction parameter or parameters, and hence provide dynamic non-linear corrections, as discussed above. For example, as illustrated in FIG. 8, if the resistivity $\rho_0$ of the first coating 146 and the resistance R of the linear resistors 60, 62 vary when subjected to environmental variations of temperature and/or humidity, the non-linear correction parameter β will not be stable and will drift from the value it had been on the production floor to the value it is when away from the production floor and in actual operation. Various aging effects may also cause the non-linear correction parameters to change. Dynamic non-linear corrections provide a means to adapt to such drifts and allow further increases in options for cost reduction by permitting use of materials, manufacturing processes, and designs that may allow the non-linear correction parameter to drift.

Referring to FIG. 17, digitizing circuit 510 could be, for example, a standard 5-wire controller product such as Elo TouchSystems' 2210 Serial Controller. In this case, the analog touch information 500 takes the form of voltages generated by sheet 24 that corresponding to X and Y excitations of the substrate 22. Assuming the touchscreen corresponds to the touchscreen 150, described above, digitizing circuit 510 produces digital touch information 506 that is related to x' and y' of equations [3] and [4] by simple offsets and magnifications. The digital touch information 106, namely (x',y') includes non-linear distortions. These distortions are corrected in correction-application circuit 512. Correction-application circuit 512 may be, for example, a host computer that runs touchscreen driver software that contains correction algorithms based on equations [5] and [6]. In this manner, correction-application circuit 512 converts raw non-linear position measurements (x',y') into (x,y), the desired touch coordinates 518.

Additionally, the non-linear correction parameter 508 may be determined as follows. Functioning as an Ohmmeter, digitizing circuit 514 may measure Rx and $R_Y$ of touchscreen 150 as given in equations [7] and [9]. For example, if predetermined voltages are applied to corner contacts 30, 32, 34, and 36 of touchscreen 150, then measurable information 502 may be generated by the resulting currents between the touchscreen 50 and the digitizing circuit 514. In this case, the digital measurable information 504 is the resistances $R_X$ and $R_Y$ in digital form. Correction-parameter circuit 516 then uses equation [10], for example in the form of a look up table containing various values of the resistance ratio $R_X/R_Y$ and corresponding values of the non-linear correction parameter 508, to convert the digital measurable information 504 into a non-linear correction parameter 108, such as β. The formulas of this example (FIG. 8) quantitatively illustrate one specific embodiment of the concepts illustrated in FIGS. 1 and 17.

Figure 10:
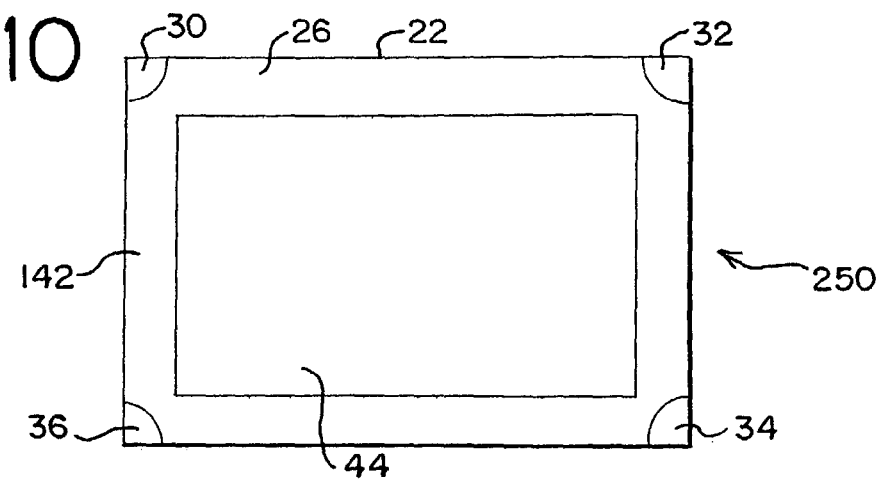
FIG. 10 is a plan view of a substrate of a touchscreen, according to an embodiment of the present invention.

Referring to FIG. 10, a touchscreen 250 is shown wherein the first coating 26 includes an interior region 44 have a first resistivity $\rho_A$ and an exterior region 142 having a second resistivity $\rho_B$, wherein the first and second resistivities $\rho_A$, $\rho_B$ are not equal. The exterior region 142 borders and surrounds the interior region 44. Preferably, the exterior region 142 is quadrangular in that it has four sides, as illustrated in FIG. 10. Touchscreens 250 that include a first coating 26 having an interior region 44 and an exterior region 42, will also be known herein as picture-frame touchscreens. Interior region 44 and exterior region 142 can be created in one of many ways. For example, during the process of applying the first coating 26 on the substrate 22, a mask may be placed over the substrate 22 to shadow and halt the deposition of the first coating 26 on a subset of the surface of the substrate 22. The creation of the interior region 44 and the exterior region 142 enables the manufacture of the substrate 22 having two regions 42, 44 corresponding to two different resistivities $\rho_A$, $\rho_B$. The exterior region 142 borders the substrate 22, as illustrated in FIG. 10. The contacts 30, 32, 34, 36 are located on the substrate 22 within the exterior region 42, as illustrated in FIG. 10.

If $\rho_A/\rho_B$ approaches ∞, that is, if the first resistivity $\rho_A$ of the interior region 44 becomes very large compared to the second resistivity $\rho_B$ of the exterior region 46, the touchscreen 250 would become linear. If the touchscreen 250 becomes linear, the non-linear correction parameter(s) would approach zero, however, the touchscreen 250 would then suffer from an increase in power requirements and an increase in its susceptibility to electronic noise. It is preferable, therefore, to design a touchscreen 250 that is non-linear yet has the advantages of a linear touchscreen, mainly, in that the touch position may be determined with extreme accuracy.

Examples of non-linear touchscreens 250 having an interior region 44 and an exterior region 42, and the distortions encountered in such touchscreens 250, are found in published PCT Application No. WO/98/19283 A1, published May 7, 1998, and corresponding to European Patent Application No. EP01010156 to Hurst, Ritchie, Bouldin, and Warmack, the specification of which is herein incorporated by reference. PCT Application No. WO/98/19283 A1 also describes a breadth of approaches to non-linear corrections in touchscreens, from general mathematical fitting to using various physical principles to limit the number of free parameters to be fitted. Additionally, U.S. Pat. No. 5,940,065 to Wilson and Babb, the specification of which is herein incorporated by reference, describes non-linear correction parameters that may be applied to the touchscreen 250 and the touchscreen system 20 that are both described herein.

Figure 5:
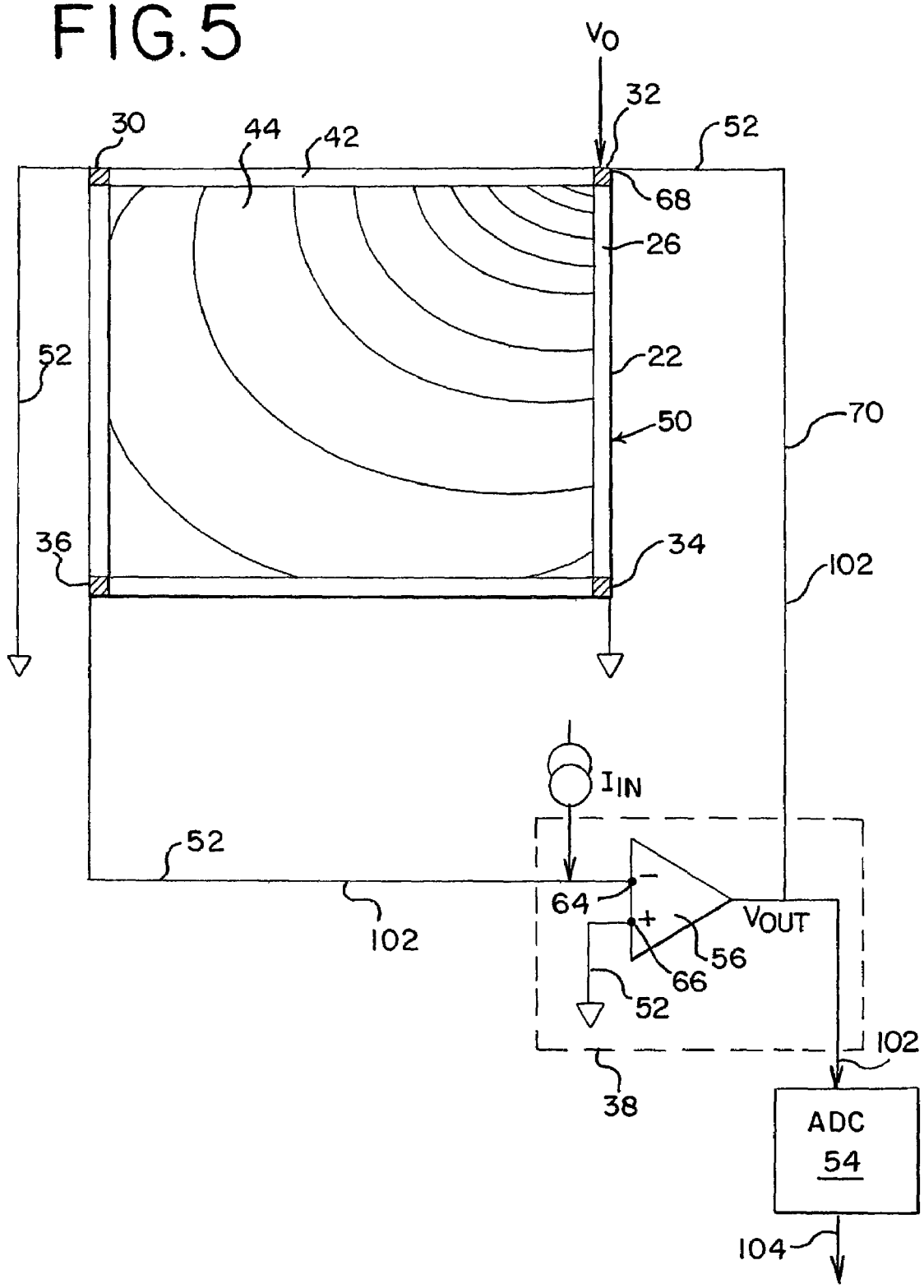
FIG. 5 is one example of a digitizing circuit that generates measurable information, according to an embodiment of the present invention.

In the above-described touchscreen 250, variations in the ratio $\rho_A/\rho_B$ are likely to be a dominant source of variation in non-linear correction parameters. As in the previous example, one can readily measure the resistance $R_X$ in the X direction and the resistance $R_Y$ in the Y direction. However, $R_X$ and $R_Y$ both may depend mainly on the exterior resistivity $\rho_A$ and be rather insensitive to the interior resistivity $\rho_B$, so that the ratio $R_X/R_Y$ may be rather insensitive to the ratio $\rho_A/\rho_B$ that largely determines the magnitude of the non-linear distortions. Thus, additional measurements that are sensitive to interior resistivity $\rho_B$ may be important. FIG. 5 shows one method for making such a measurement that is sensitive to $\rho_B$.

Referring to FIG. 5, the high-impedance negative input 64 of operational amplifier 56 accepts no current, and hence all of the fixed amount of current $I_{in}$ from the current source is injected at corner 36 of the touchscreen substrate. Furthermore, the positive input 66 of the operational amplifier 56 is tied to ground so that, the negative feedback loop results in a virtual ground at input 64 and corner 36. By grounding corners 30 and 34 of the substrate, there is no net voltage drop between corners 30 and 36 nor between corners 34 and 36, hence discouraging the current $I_{in}$ from going to corners 30 and 34 along the substrate exterior. Instead, the current tends to flow from corner 36 to the diagonal corner 32 through the interior substrate region with resistivity $\rho_B$. Thus the feedback voltage $V_{out}$ at corner 32 generated by the operation amplifier 56 is largely determined by the interior resistivity $\rho_B$. Combining such a $\rho_B$ sensitive measurement with a $\rho_A$ sensitive measurement, such as $R_X$ or $R_Y$, the ratio $\rho_A/\rho_B$ can be accurately measured and the non-linear correction parameters accurately determined. Circuits with this type of measurement capability can be included in automated production-floor equipment, or alternatively within touchscreen controller products that form part of the installed touchscreen system.

Figure 11:
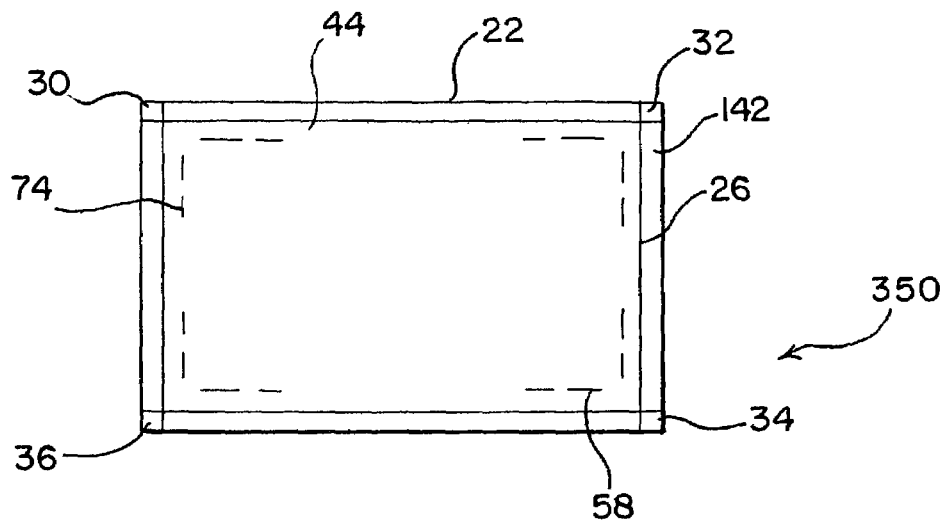
FIG. 11 is a plan view of a substrate of a touchscreen, according to an embodiment of the present invention.

Referring to FIG. 11, a variation of the above-described touchscreen 250 is illustrated as touchscreen 350. The touchscreen 350 is shown and described in more detail in U.S. Pat. No. 4,797,514 to Talmadge & Gibson (hereinafter "the Talmadge patent"), the specification of which is herein incorporated by reference. The touchscreen 350 corresponds to the non-linear picture-frame touchscreen 250 described above with the addition of deletion lines 74 in the first coating 26, as illustrated by the dashed lines. The deletion lines 74 are arranged in an L-shaped pattern adjacent to each of the contacts 30, 32, 34, 36 and are located within the interior region 44, as illustrated in FIG. 11. The deletion lines 74 linearize the touchscreen 350.

The touchscreen of FIG. 11 is one option for the touchscreen 50 of FIG. 1. The addition of measurement circuit 114, non-linear correction parameter circuit 116, and non-linear correction application circuit 112, a cost-reduced variation of touchscreen 350 be implemented in which the ratio of border frame resistivity and touch region resistivity may vary with temperature and humidity. For example, the interior region 44 may comprise an ITO coating whereas the exterior region 242 may be screen printed with a conductive composite polymer ink. The resistivities of such different materials typically respond differently to variations in operating temperature and humidity. Nominally this design results in a linear touchscreen, that is, by design the nominal value of the non-linear correction parameters are zero. However, as the resistivities of the materials within the interior region 44 and the exterior region 242 drift with environmental conditions, the non-linear corrections become non-zero. However, if dynamic non-linear corrections are provided, as described above, this becomes less of a problem and therefore materials used in the manufacturing process can be chosen to minimize manufacturing costs.

The above-described invention can also be applied to touchscreens having border electrode patterns with discrete resistor elements (hereinafter "discrete electrode patterns"), as shown and described in U.S. Pat. No. 5,045,644 to Dunthorn (hereinafter "the Dunthorn patent"), the specification of which is herein incorporated by reference. If the resistances associated with a discrete-electrode pattern in the exterior region 42 vary with respect to the resistivity of the interior region 44, then the touchscreen becomes non-linear. Such non-linearity may be caused by either manufacturing or environmental factors. In any case, such touchscreens with discrete electrode patterns are yet another alternative for touchscreen 50 of FIG. 1.

Figure 12:
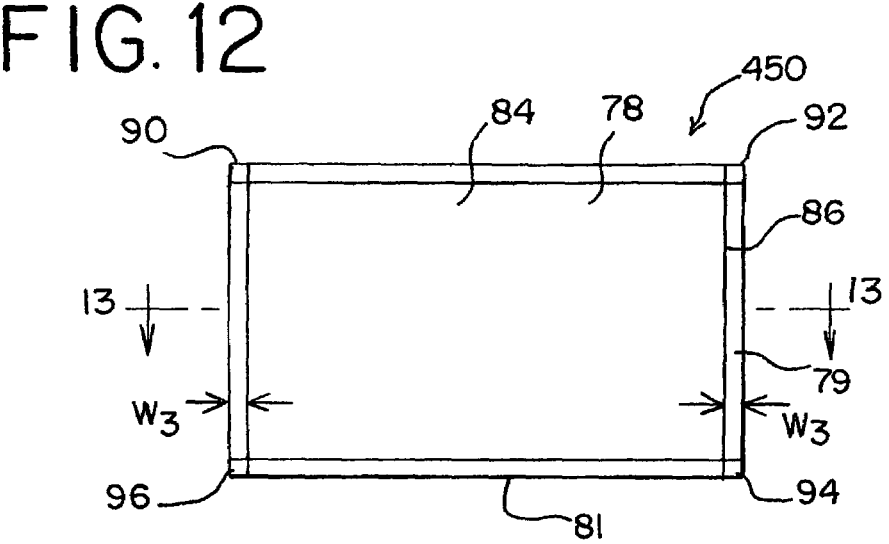
FIG. 12 is a plan view of a substrate of a touchscreen, according to an embodiment of the present invention.
Figure 13:
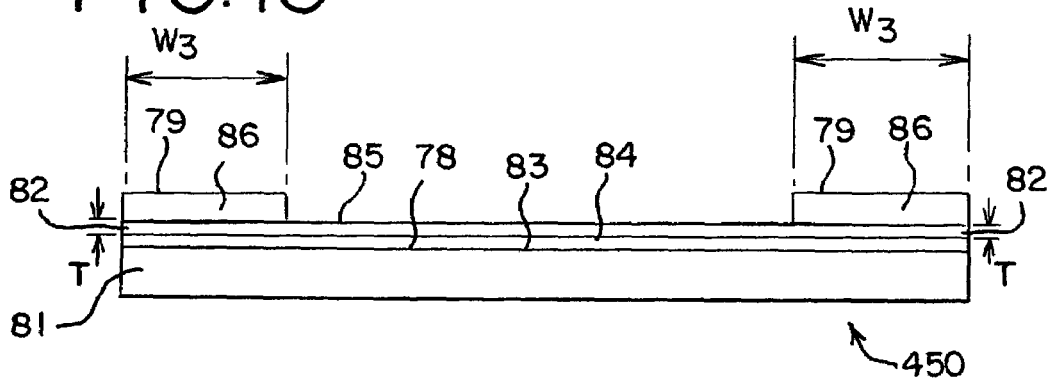
FIG. 13 is a cross-sectional view along line 13—13 of the substrate shown in FIG. 12.

Referring to FIGS. 12 and 13, a capacitive touchscreen 450 is shown having a substrate 81 with an interior region 78 and an exterior region 79 surrounding the interior region 78. The capacitive touchscreen 450 also includes a first contact 90, a second contact 92, a third contact 94, and a fourth contact 96 all located within the exterior region 79. The substrate 81 comprises a rigid substrate, such as, glass or hardened plastic. As illustrated in cross-section in FIG. 13, a first coating 84 overlies the substrate 81. The first coating 84 may comprise a resistive coating, such as, tin-oxide, indium-tin-oxide, or antimony-tin-oxide. A dielectric layer 82 overlies the first coating 84, wherein the dielectric layer 82 forms the touch area that is capacitively coupled to coating 84, and also provides DC insulation between the first coating 84 and the second coating 86 and an AC coupling between the first coating 84 and the second coating 86. The impedance per unit length of the dielectric layer 82 is controlled by the height, the width, the dielectric constant, and the operating frequency of the dielectric layer 82. The dielectric layer 82 comprises a dielectric such as, but not limited to, glass, silica coatings or polymer films. A second coating 86 overlies the dielectric layer 82. The second coating 86 may comprise a resistive coating, such as, tin-oxide, conductive polymer composite, or a fired ceramic resistive material.

In plan view, as illustrated in FIG. 12, the capacitive touchscreen 450 is similar to the touchscreen 250, as illustrated in FIG. 10. When a grounded conductive object such as a human finger touches or presses against the top surface 85 of dielectric layer 82, an AC current to ground results, which in turn is provided by AC current supplied at the contacts 90, 92, 94, 96. Circuitry measures values for the four AC currents supplied to the contacts 90, 92, 94, 96, and from the ratios of these four AC currents, the touch position on touchscreen 450 is then determined. Such a touchscreen may be non-linear and the degree of non-linear distortions in touchscreen 450 depend on the width $W_3$ of the second coating 86 and the thickness T of the dielectric layer 82, as well as the operating frequency.

In one embodiment, the touch system including touchscreen 450 has the ability to adjust an operating frequency of the touchscreen 450 by a certain amount, such as plus or minus ten percent, in order to dodge frequency spikes in ambient electromagnetic backgrounds. The impedance per unit length of the AC coupling between the second coating 86 and the first coating 84 and the first coating 84 is determined as follows.

$$Im(Z) = T/(2\pi f * \in * W_3) \qquad [11]$$

Here T is the thickness of the dielectric layer 82, $\in$ the dielectric constant of the dielectric layer 82, and $W_3$ is the width of the second coating 86. Note that this impedance per unit length varies with the operating frequency f. Thus changes of the operating frequency will induce changes in the non-linear parameters. The touch system incorporating touchscreen 450 may contain first-principle predictions of how the non-linear correction parameters vary with frequency. Alternately, the dynamic non-linear correction methods of this invention, as described above, may be applied to track changes in the non-linear correction parameters for the touchscreen 450 as the frequency is varied. Preferably, a combination of both methods is used.

Figure 14:
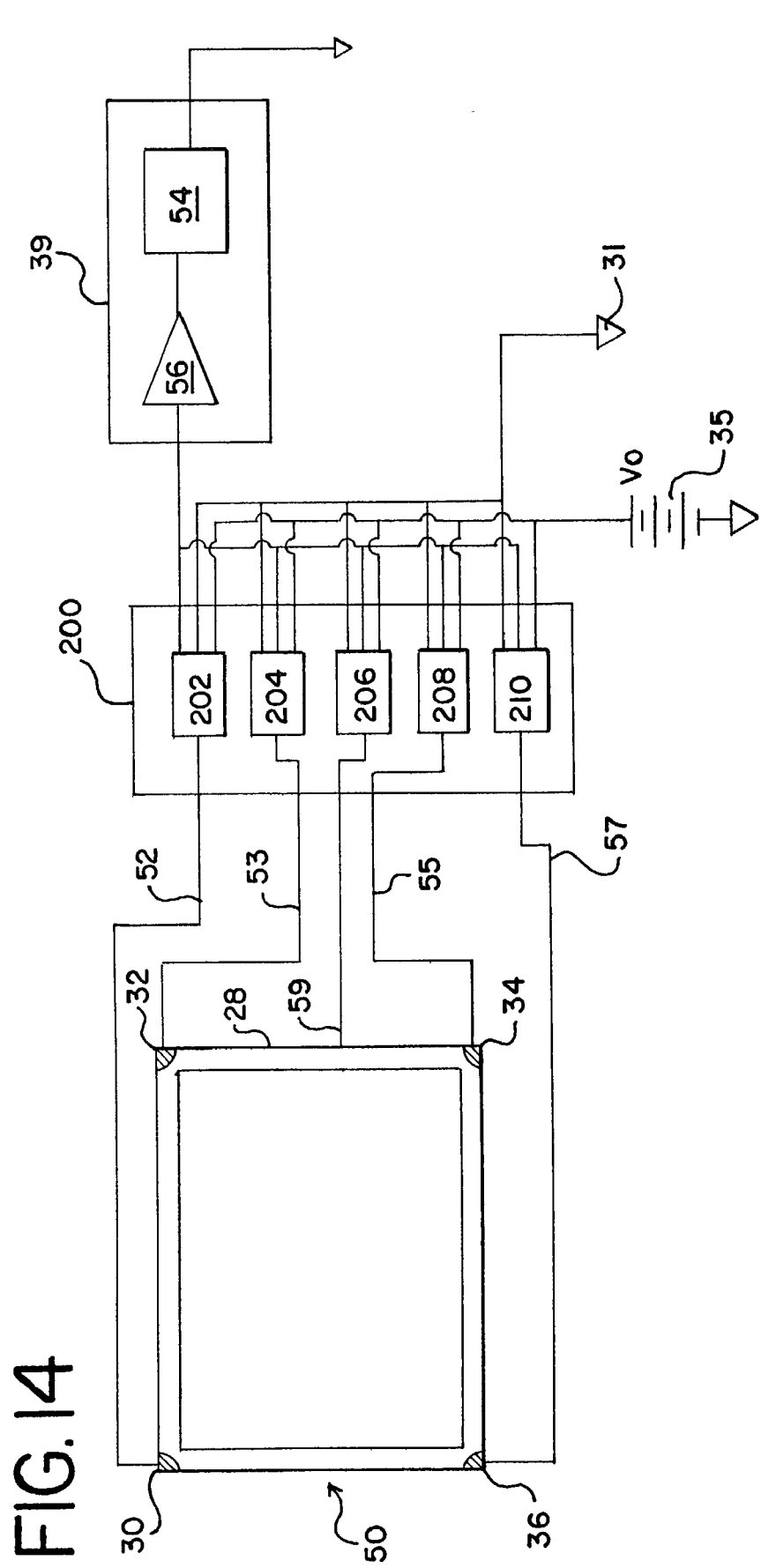
FIG. 14 is a schematic view of a part of a touchscreen system, according to an embodiment of the present invention.

The electronic circuitry of touchscreen system 20 may be any one of a number of types of wiring system, such as, for example, capacitive four-wire, resistive five wire, and resistive nine-wire wiring systems. For illustrative purposes only, a touchscreen system 20 having a five-wire wiring system are a resistive touchscreen will be described, as illustrated in FIG. 14. A five-wire wiring system, as illustrated in FIG. 14, includes a first wire 52, a second wire 53, a third wire, 55, a fourth wire 57, and a fifth wire 59. The contacts 30, 32, 34, 36 are connected to the first wire 52, the second wire 53, the third wire, 55, and the fourth wire 57, respectively. The second coating 28 is connected to the fifth wire 59. The wires 52, 53, 55, 57, and 59 are also connected to a multiplexor 200. The multiplexor 200 has four channels 202, 204, 208, 210 which are connected to the first wire 52, the second wire 53, the third wire 55, and the fourth wire 57, respectively. Additionally, the multiplexor 200 has a fifth channel 206 which is connected to the fifth wire 59.

The channels 202, 204, 206, 208, 210 are all connected with either a ground circuit 31, a voltage source 35, or a digitizing circuit 39, depending on the state of the multiplexor 200. Thus, the multiplexor 200 allows the contacts 30, 32, 34, 36 and the second coating 28 to be connecting with either a ground circuit 37, a voltage source 35, or a digitizing circuit 39, depending on the state of the multiplexor 200. Preferably, the digitizing circuit 39 includes an analog-to-digital converter (herinafter "ADC") circuit 54 connected with the amplifier 56, as illustrated in FIG. 14. The ADC circuit 54 converts the output of the amplifier 56 from an analog signal to a digital signal.

Some of the different types of states in which the multiplexor 200 can be in, and therefore, the combinations that the contacts 30, 32, 34, 36 and the ground circuit 37, the voltage source 35, or the digitizing circuit 39 can be connected through multiplexor 200 are enumerated in Table A, shown below. As listed in Table A, the term "$V_0$" represents a voltage applied to the contact corresponding to the column in which the term "$V_0$" is listed. Additionally, the term "0" represents that zero voltage is being applied to the contact corresponding to the column in which the term "0" is listed. Furthermore, the term "sense" indicates that the digitizing circuit 39 is monitoring an electrical characteristic at the contact or at the second coating corresponding to the column in which the term "sense" is listed. For example, in the first state, shown in Row 1 of Table A, a voltage "$V_0$" is being applied to all of the contacts 30, 32, 34, 36, and the digitizing circuit is sensing an electrical characteristic at the second coating, therefore, the touchscreen system 20 is in a "detect" mode waiting for a touch to occur on the touchscreen 50. When a touch has occurred on the touchscreen 50, and the touchscreen system 20 is sensing the location of the touch, the coordinate in the X-direction is measured by using the state in Row 2 of Table A. Similarly, the touchscreen system 20 senses the location of the touch in the Y-direction by using the state in Row 3 of Table A. In the fourth through sixth states and the ninth through thirteenth states, shown in Rows 4–6 and 9–13 of Table A, the digitizing circuit 39 digitizes a voltage that is sensitive to, for example, the ratio $\rho_A/\rho_B$ as discussed above. For example, in the fourth state, the digitizing circuit 39 is monitoring the voltage at contact 30 when contacts 32 and 36 are grounded and contact 34 is at voltage $V_0$. In the seventh and eighth states, shown in Rows 7 and 8 of Table A, the touchscreen system 20 is conducting an ADC scale calibration by setting the first, second and third contacts 30, 32, 34 to either zero voltage or a voltage of "$V_0$" and measuring the resulting voltage at the fourth contact 36.

TABLE A

| State | First Contact | Second Contact | Third Contact | Fourth Contact | Second Coating on Sheet | Function |
|---|---|---|---|---|---|---|
| 1 | $V_0$ | $V_0$ | $V_0$ | $V_0$ | Sense | Detect |
| 2 | 0 | 0 | $V_0$ | $V_0$ | Sense | Location of Touch in X Direction |
| 3 | 0 | $V_0$ | $V_0$ | 0 | Sense | Location of Touch in Y Direction |
| 4 | Sense | 0 | $V_0$ | 0 | | Resistance Ratio |
| 5 | $V_0$ | Sense | $V_0$ | 0 | | Resistance Ratio |
| 6 | $V_0$ | 0 | $V_0$ | Sense | | Resistance Ratio |
| 7 | $V_0$ | $V_0$ | $V_0$ | Sense | | ADC scale calibration ($V_0$) |
| 8 | 0 | 0 | 0 | Sense | | ADC scale calibration (ground) |
| 9 | 0 | Sense | 0 | $V_0$ | | Resistance Ratio |
| 10 | $V_0$ | 0 | Sense | 0 | | Resistance Ratio |
| 11 | 0 | $V_0$ | 0 | Sense | | Resistance Ratio |
| 12 | 0 | $V_0$ | Sense | $V_0$ | | Resistance Ratio |
| 13 | $V_0$ | 0 | $V_0$ | Sense | | Resistance Ratio |
| 14 | Sense | $V_0$ | 0 | $V_0$ | | Resistance Ratio |

The first three states, as shown in Rows 1–3 of Table A, support standard 5-wire touchscreen operation. When not in use, the touchscreen 50 is in "detect" mode and draws no current. From a power management perspective, this can be referred to as a "sleep mode." However, the moment a voltage $V_0$ appears on the second coating 28 of the sheet 24, the touchscreen 50 switches to an X/Y measurement mode, as shown in the second and third states. In the X/Y measurement mode, while the touchscreen 50 is being touched, the digitizing circuit 39 will alternate between measuring X and Y voltage gradients, thus enabling 2-D coordinate measurements.

After powering up the touchscreen 50, and preferably at periodic time intervals thereafter, the digitizing circuit 39 will wait for a moment during which the touchscreen 50 is not being touched, and then will proceed to determine the non-linear correction parameters as follows. Using the fourth state, as shown in Row 4 of Table A, with the second contact and the fourth contact grounded, the third contact is supplied voltage $V_0$, the resulting voltage at the first contact 30 is measured. The voltage thus measured at first contact 30 is a function of the resistivity ratio. In the limit the resistivity ratio goes to zero, one can completely neglect the conductivity of the touch area and the first contact 30 will be at zero volts. In the limit the resistivity ratio goes to infinity, the conductivity in the exterior region 42 is effectively eliminated leaving us simply with four corner contacts 30, 32, 34, 36.

For example, if the touchscreen 50 is of the type of touchscreen 250 shown in FIG. 10 and has a 3–4 aspect ratio, when the resistivity ratio $\rho_A/\rho_B$ goes to zero, the voltage at the first contact 30 is equal to about 28% of the voltage $V_0$ that is supplied to the third contact 34. Between these limits, the measured voltage at the first contact 30 monotonically decreases with increasing values of the resistivity ratio. The detailed mapping between the measured voltage at the first contact 30 and the resistivity ratio can be determined by computer simulation. In this manner, the digitizing circuit 39, using the fourth state, can measure and track changes in the resistivity ratio.

If temperature or humidity variations induce changes in the resistivity ratio, the digitizing circuit 39 easily tracks these changes and the linearity of the touchscreen system 20 remains stable. This system-level robustness permits use of lower cost materials and manufacturing processes that might otherwise be considered unacceptable for stability reasons. Similarly, the manufacturing line benefits from greatly loosened tolerance on the resistivity ratio.

Like the fourth state, the fifth and sixth states, shown in Rows 5 and 6 of Table A, respectively, provide equivalent measurements of the resistivity ratio. Having redundant measurements of the resistivity ratio is of interest. If the touchscreen 50 is indeed top/bottom and left/right symmetric as designed, then the redundant measurements provide no new information. However, if a manufacturing defect breaks the symmetry in the touchscreen 50, the fourth, fifth, and sixth states may no longer provide consistent determinations of the resistivity ratio, and the digitizing circuit 39 will know that the touchscreen 50 is asymmetric. Such a self-diagnostic capability is a feature of the touchscreen system 20 of this example.

The seventh and eight states, listed in Rows 7 and 8 of Table A, provide means to determine two parameters, e.g. offset and gain, for linear mapping between digitized ADC counts and corresponding sensed voltages, thus allowing for a more completely self-calibrating touchscreen system 20.

While multiplexor 200 is shown in FIG. 14 with five channels, four channels may be sufficient for many applications. Note that for the first seven states in Table A, the third contact 34 is always at voltage $V_0$. If the first seven states are sufficient, then multiplexor channel 208 can be dispensed with and corner 34 permanently connected to voltage source 35. Providing the fifth channel 208 simply allows for additional measurements such as those of the ninth through fourteenth states, shown in Rows 9–14 of Table A. The option to use only four multiplexor channels is of commercial interest as many current embedded resistive controllers intended for 4-wire touchscreens contain circuitry similar to FIG. 14 but with only four multiplexor channels.

Referring to FIGS. 14 and 17, note that the circuitry shown in FIG. 14, for example multiplexer 200 and digitizing circuit 39, serve both to digitize touch information 500 and to digitize electronic characteristics 502 of the touchscreen 50. In this case, the hardware of digitizing circuits 510 and 514 are one and the same. However, the function of this hardware will vary with time. When touchscreen 50 is being touched, the circuitry of FIG. 14 digitizes analog touch information 500 and hence functions as the digitizing circuit 510 of FIG. 17. When the touchscreen 50 is not being touched, and the touchscreen system 20 chooses to update non-linear correction parameter 508, then the circuitry of FIG. 14 probes the electrical characteristics of the touchscreen 50 and hence functions as digitizing circuit 514 of FIG. 17. Circuits of the type shown in FIG. 14 are commonly found in chip sets used in hand-held computers such as PDAs. Such circuits are primarily intended to interface with linear 4-wire resistive touchscreens, but with appropriate changes to software code can be adapted to the purposes of the present invention. Taking advantage of digital processing capabilities present in such hand-held computers, circuits 512 and 516 may conveniently take the form of software algorithms running in general purpose microprocessors. All elements given in FIG. 17 may be provided in a hand-held computer for little incremental cost.

Figure 15:
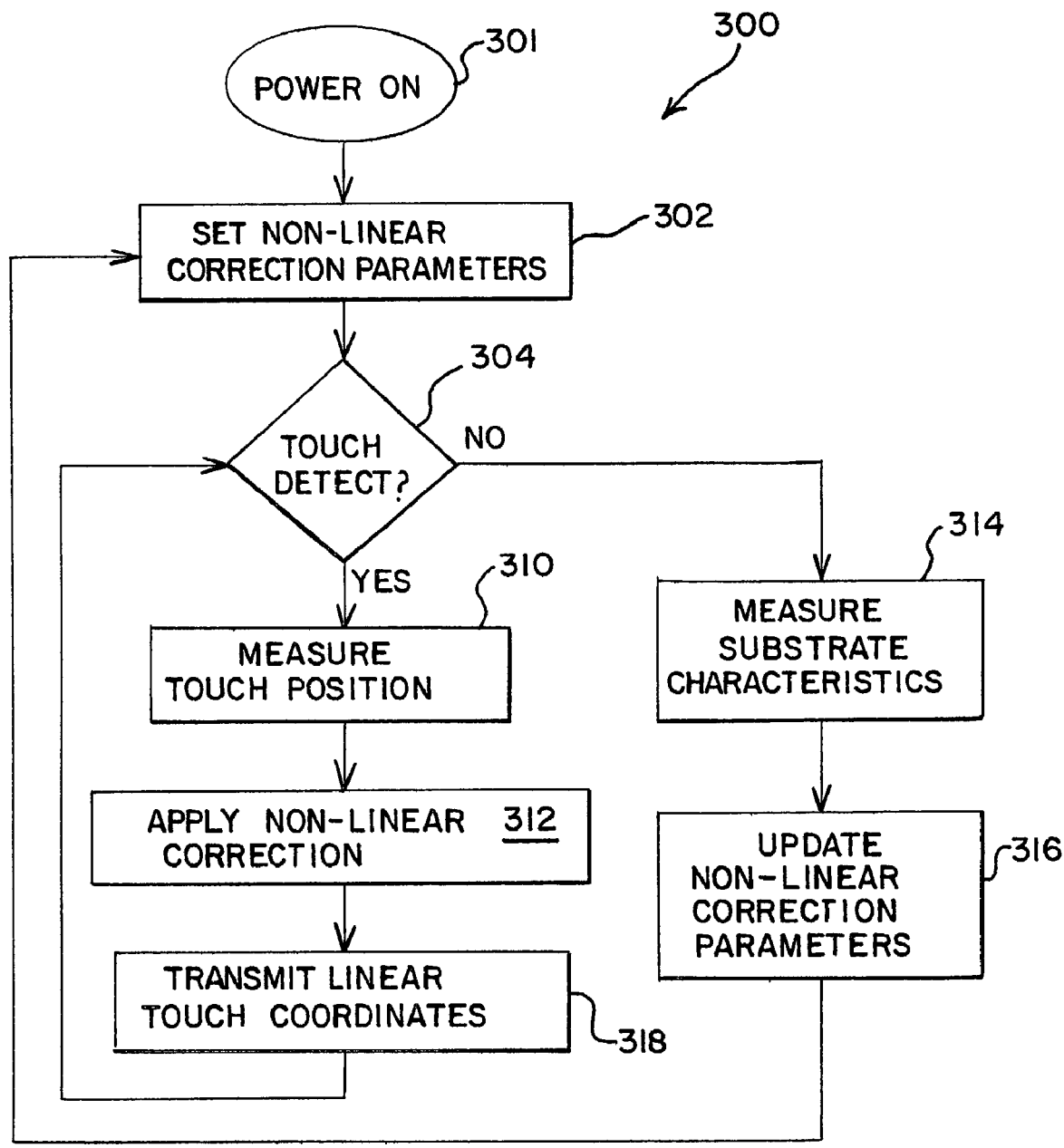
FIG. 15 is a flow chart illustrating the operation of a touchscreen system, according to an embodiment of the present invention.
Figure 16:
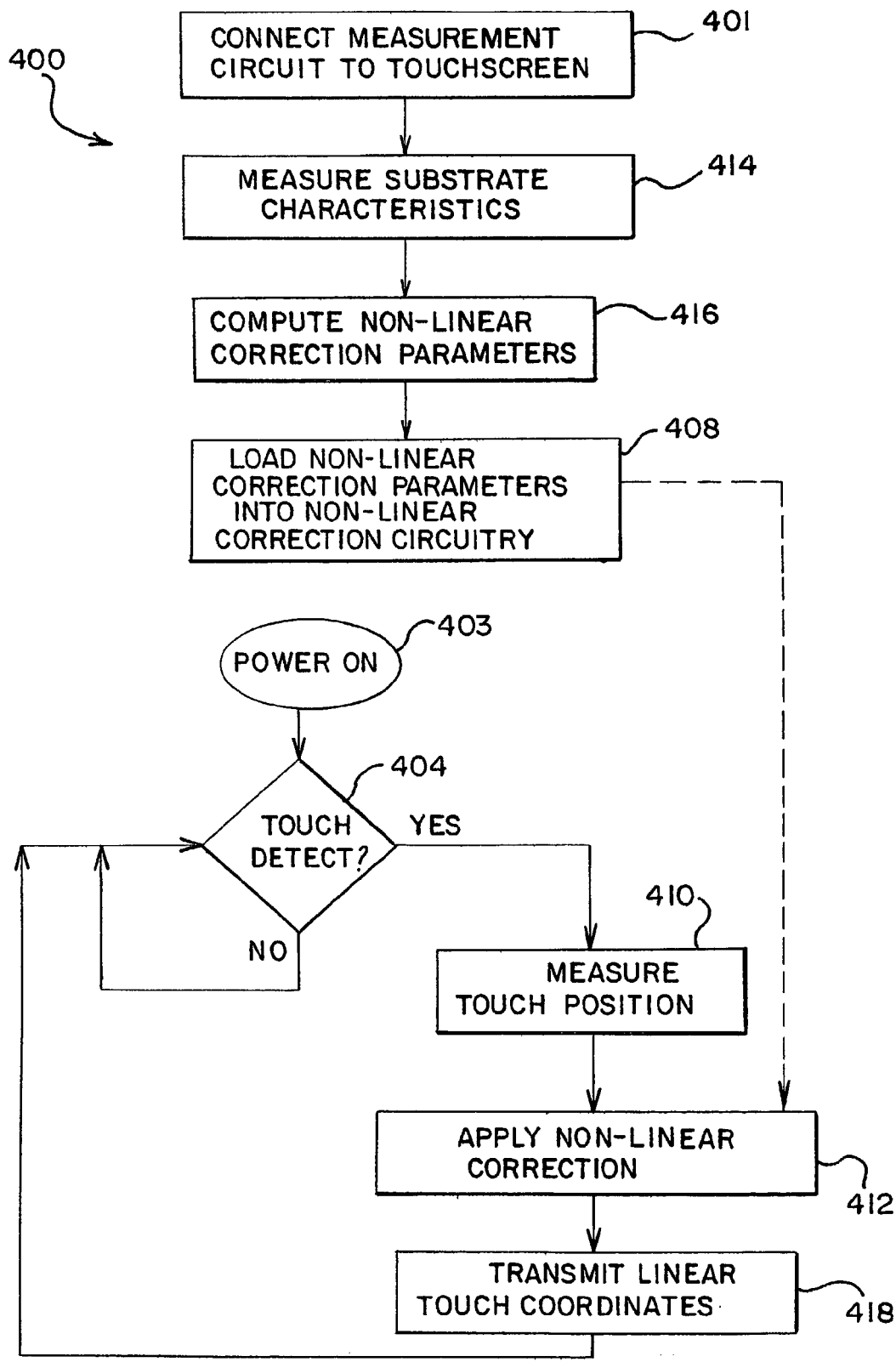
FIG. 16 is a flow chart illustrating the operation of a touchscreen system, according to an embodiment of the present invention.

FIGS. 15 and 16 are flowchart illustrations of a method according to the invention. It will be understood that each block of the flowcharts, and combinations of blocks in the flowcharts, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture, such as, instruction means which implement the function specified in the flowchart block or blocks. The computer program instructions may also be loaded onto a computer or other programmable data processing apparatus to cause a series of operational steps to be performed on the computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts support combinations of means for performing the specified functions, combinations of steps for performing the specified functions and program instruction means for performing the specified functions. It will also be understood that each block of the flowcharts, and combinations of blocks in the flowcharts, can be implemented by special purpose hardware-based computer systems which perform the specified functions or steps, or combinations of special purpose hardware and computer instructions.

As seen in FIG. 15, a touchscreen operation 300 is shown. The touchscreen operation 300 is performed on the touchscreen system 20. The touchscreen operation 300 is initiated in block 301, wherein the touchscreen system 20 is turned on by supplying power to the touchscreen system 20. Once the touchscreen system 20 is turned on, the touchscreen operation 300 then sets or programs the non-linear correction parameters in the touchscreen system 20, as illustrated in block 302. Initially, default correction parameters are set or programmed in the touchscreen system 20, however, as described below, updated correction parameters may also be set or programmed in the touchscreen system 20 after the default correction parameters are programmed in. The touchscreen operation 300 then detects whether the touchscreen 50 is being touched or not in block 304. If a touch is detected, the touchscreen operation 300 moves to block 310, however, if a touch is not detected, the touchscreen operation moves to block 314. In block 314, the touchscreen operation measures the characteristics of the substrate and generates digital measurable information 104 as a result. Upon generating digital measurable information, the touchscreen operation 300 then uses the digital measurable information 104 to determine and then update the non-linear correction parameters in block 316. Once, updated correction parameters are determined, the touchscreen operation 300 then moves to block 302 and sets or programs updated correction parameters in the touchscreen system 20.

In block 310, the touchscreen operation 300 measures the touch position on the touchscreen 50. More specifically, the touchscreen operation measures the location of a touch initiated on the touch area 21 of the touchscreen 50 in the X and Y directions by measuring an electrical characteristic, such as a voltage. By measuring the location of a touch in both the X and Y directions, the touchscreen operation 300 is able to pinpoint the location of a touch on the touch area 21 of the touchscreen 50. As used herein, a touch is initiated when pressure is applied to the touch area 21. If no pressure is applied to the touch area 21, then the no touch is detected, and the touchscreen operation 300 moves to block 314 instead of block 310. Upon measuring the touch position, the touchscreen operation 300 then generates the digital touch information 106 which represents to the touch position. Upon generating the digital touch information 106, the touchscreen operation 300 then moves to block 312 wherein the touchscreen operation applies a non-linear correction to the digital touch information 106 in order to produce corrected touch coordinates 118. The touch coordinates 118 are then transmitted, as illustrated in block 318, to an electronics device which uses the touch position information, for example, to select a menu item amongst options presented on a display device. Upon transmitting the touch coordinates, the touch operation 300 then moves back to block 304 and proceeds to detect whether the touchscreen 50 is being touched or not.

As seen in FIG. 16, a correction operation 400 is initiated in block 401, wherein a measurement circuit is in communication with the touchscreen 50. The measurement circuit includes a digitizing circuit 614 and a correction-parameter circuit 616. Upon connecting the measurement circuit to the touchscreen, characteristics of the substrate 22 of the touchscreen 50 are then measured, as illustrated in block 414. Upon measuring the characteristics of substrate 22, digital measurable information 104 is generated. The measurable information 104 is used to compute or determine non-linear correction parameters 108, as illustrated in block 416. Once the non-linear correction parameters 108 are determined, they are in block 408 then loaded or programmed into the touchscreen system 20, and more specifically into non-linear correction circuitry found within the touchscreen system 20 and later used to apply a non-linear correction on the touch information 100, as described below.

A power on operation is initiated in block 403, wherein the touchscreen 50 is turned on by supplying power to the touchscreen 50. Upon powering on the touchscreen 50, the correction operation 400 then detects whether the touchscreen 50 is being touched or not in block 404. If a touch is detected, the correction operation 400 moves to block 410, however, if a touch is not detected, the touchscreen operation remains at block 404, as illustrated in FIG. 16. In block 410, the correction operation 400 measures the touch position on the touchscreen 50. More specifically, the correction operation 400 measures the location of a touch initiated on the touch area 21 of the touchscreen 50 in the X and Y directions by measuring an electrical characteristic, such as a voltage. By measuring the location of a touch in both the X and Y directions, the correction operation 400 is able to pinpoint the location of a touch on the touch area 21 of the touchscreen 50. As used herein, a touch is initiated when pressure is applied to the touch area 21. If no pressure is applied to the touch area 21, then the no touch is detected, and the correction operation 400 remains at block 404 instead of moving to block 410. Upon measuring the touch position, the correction operation 400 then generates digital touch information 106 which represents to the touch position. Upon generating the digital touch information 106, the correction operation 400 then moves to block 412 wherein the touchscreen operation applies a non-linear correction to the digital touch information 106 in order to produce corrected touch coordinates 118. The touch coordinates 118 are then transmitted, as illustrated in block 418, to an electronics device which uses the corrected touch position information to, for example, select a menu item. Upon transmitting the touch coordinates, the correction operation 400 then moves back to block 404 and proceeds to detect whether the touchscreen 50 is being touched or not.

Thus, there has been disclosed in accordance with the invention, an apparatus and method for generating signals representing a touch position in which non-linear corrections are applied that fully provides the advantages set forth above. Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications that fall within the scope of the appended claims and equivalents thereof.

The invention claimed is:

1. A touchscreen system for generating touch coordinates comprising:
   a touchscreen which generates (a) measurable information indicative of a given electrical characteristic in the touchscreen in the absence of a touch and (b) touch information in response to a touch;
   a correction-parameter circuit in communication with the touchscreen, wherein the correction-parameter circuit receives the measurable information and generates a non-linear correction parameter; and
   a correction-application circuit which receives the touch information and the non-linear correction parameter and corrects for non-linearity in the touchscreen.

2. The touchscreen system of claim 1, wherein the touchscreen further comprises a substrate having four corners and a corner contact at each corner.

3. The touchscreen system of claim 2, wherein the touchscreen is one of a five-wire touchscreen, a nine-wire touchscreen, or a capacitive touchscreen.

4. The touchscreen system of claim 2, wherein the substrate further comprises an interior region having a first resistivity $\rho_A$ and an exterior region having a second resistivity PB, wherein the first and second resistivities $\rho_A$, $\rho_B$ are not equal.

5. The touchscreen of claim 2, wherein the substrate further comprises an interior region and an exterior region, wherein the exterior region borders and surrounds the interior region.

6. The touchscreen of claim 5, wherein the interior region further comprises deletion lines.

7. The touchscreen system of claim 1, wherein the touchscreen further comprises a substrate having a first coating, wherein the first coating does not uniformly cover the substrate.

8. The touchscreen system of claim 7, wherein the first coating comprises a plurality of strips made of a first material, and wherein the substrate further comprises a gap in between each pair of strips.

9. The touchscreen system of claim 1, wherein the correction-parameter circuit generates a correction parameter having a value and the correction-application circuit uses the value for the correction parameter to correct for non-linearity in the touchscreen.

10. The touchscreen system of claim 1, wherein the correction-application circuit periodically receives the touch information and the non-linear correction parameter and periodically corrects for non-linearity in the touchscreen.

11. A touchscreen system for generating signals representing a touch position comprising:
   a substrate having four corners and a corner contact at each corner;
   a digitizing circuit in communication with each corner contact, wherein the digitizing circuit measures an electrical characteristic of one contact in the absence of a touch and generates measurable information in response; and
   a correction-parameter circuit in communication with the digitizing circuit, wherein the correction-parameter circuit generates a non-linear correction parameter.

12. The touchscreen system of claim 11, wherein the electrical characteristic is one of a resistance, a capacitance, a voltage, or a current.

13. The touchscreen of claim 11, wherein a first voltage at one corner contact is measured as a second voltage is applied to at least one of the remaining corner contacts.

14. The touchscreen of claim 13, wherein the second voltage is applied to two remaining corner contacts while a third voltage is applied to one remaining corner contact.

15. The touchscreen system of claim 11, further comprising a sheet spaced from the substrate, wherein the sheet comprises a second coating and the substrate comprises a first coating, and wherein the second coating faces the first coating.

16. The touchscreen of claim 11, further comprising a correction-application circuit which receives touch information from the digitizing circuit and the non-linear correction parameter from the correction-parameter circuit, and corrects for non-linearity in the touchscreen.

17. The touchscreen system of claim 16, wherein the correction-parameter circuit determines a resistivity ratio based upon the measurable information, and the correction-application circuit corrects for a non-linearity in the touchscreen system based upon the resistivity ratio.

18. The touchscreen system of claim 11, wherein the digitizing circuit periodically measures the electrical characteristic and periodically generates measurable information in response.

19. A method for correcting non-linearities in a touchscreen, wherein the touchscreen includes a first point spaced apart from a second point, the method comprising:
   measuring an electrical characteristic of the first point in the absence of a touch while applying one of a voltage or current to the second point;
   generating measurable information in response; and
   correcting for non-linearity in the touchscreen system using the measurable information.

20. The method of claim 19, wherein the electrical characteristic is one of a voltage, a current, a resistance, or a capacitance.

21. The method of claim 19, further comprising periodically correcting for non-linearity in the touchscreen system using the measurable information.

22. The method of claim 19, further comprising manually correcting for non-linearity in the touchscreen system using the measurable information.

23. The method of claim 19 further comprises generating a non-linear correction parameter using the measurable information.

24. A touchscreen system for generating signals representing a touch position comprising:
   a substrate including a first contact spaced apart from a second contact and a first coating overlying the substrate and in communication with the first and second contacts;
   a sheet spaced from the substrate, wherein the sheet includes a second coating facing the first coating, wherein the sheet is movable from a first position, in which the second coating is not in contact with the first coating, to a second position, in which the second coating is in contact with the first coating;
   a digitizing circuit in communication with both the first and the second contacts, wherein the digitizing circuit receives first analog measurable information in the absence of a touch and generates digital measurable information in response, and wherein the digitizing circuit receives the analog measurable information when the sheet is in the first position; a correction-parameter circuit in communication with the digitizing circuit, wherein the correction-parameter circuit receives the digital measurable information and generates a correction parameter in response; and
   a correction-application circuit which receives the correction parameter and corrects for non-linearity in the touchscreen system using the correction parameter.

25. The touchscreen system of claim 24, wherein the substrate includes a third contact spaced apart from a fourth contact.

26. The touchscreen system of claim 25, wherein the digitizing circuit is in communication with both the third and the fourth contacts, and wherein the digitizing circuit receives second analog measurable information and generates digital measurable information in response.

27. A method for correcting non-linearities in a touchscreen, wherein the touchscreen comprises a substrate and a sheet spaced from the substrate, the substrate including a first contact spaced apart from a second contact and a first coating overlying the substrate and in communication with the first and second contacts, the sheet including a second coating facing the first coating, wherein the sheet is movable from a first position, in which the second coating is not in contact with the first coating, to a second position, in which the second coating is in contact with the first coating, the method comprising:
   measuring an electrical characteristic of the first contact in the absence of a touch, while applying one of a voltage or current to the second point, when the sheet is in the first position;
   generating measurable information in response to the measuring; and
   correcting for a non-linearity in the touchscreen system using the measurable information.

28. The method of claim 27, wherein the correcting for a non-linearity is periodically performed on the touchscreen.

29. A touchscreen system for generating signals representing a touch position comprising:
   a touchscreen;
   a digitizing circuit in communication with the touchscreen, wherein the digitizing circuit receives analog measurable information in the absence of a touch and generates digital measurable information in response; and a correction-parameter circuit in communication with the digitizing circuit, wherein the correction-parameter circuit corrects for a non-linearity in the touchscreen using the digital measurable information.

30. A method for correcting non-linearities in a touchscreen, the method comprising:

measuring an electrical characteristic of the touchscreen in the absence of a touch, wherein the electrical characteristic has a value; and correcting for a non-linearity in the touchscreen system using the value for the electrical characteristic.

31. The method of claim 30 wherein the correcting for the non-linearity is performed dynamically.

32. The method of claim 30 wherein the correcting for the non-linearity is performed using production floor test equipment.

33. The method of claim 30 wherein the correcting for the non-linearity is performed using controller electronics.

* * * * *